US012120283B2

(12) United States Patent
Ikeda et al.

(10) Patent No.: US 12,120,283 B2
(45) Date of Patent: Oct. 15, 2024

(54) THRESHOLD MATRIX GENERATION METHOD, IMAGE DATA GENERATION METHOD, STORAGE MEDIUM STORING PROGRAM, THRESHOLD MATRIX, AND IMAGE DATA GENERATION APPARATUS

(71) Applicant: SCREEN HOLDINGS CO., LTD., Kyoto (JP)

(72) Inventors: Yusaku Ikeda, Kyoto (JP); Makoto Narazaki, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 18/161,452

(22) Filed: Jan. 30, 2023

(65) Prior Publication Data

US 2023/0276013 A1 Aug. 31, 2023

(30) Foreign Application Priority Data

Feb. 25, 2022 (JP) ................................ 2022-027760

(51) Int. Cl.
*H04N 1/405* (2006.01)
(52) U.S. Cl.
CPC .................... *H04N 1/405* (2013.01)
(58) Field of Classification Search
None
See application file for complete search history.

(56) References Cited

U.S. PATENT DOCUMENTS

| 6,507,666 | B1 | 1/2003 | De La Torre |
| 6,741,735 | B2 | 5/2004 | De La Torre |
| 7,046,845 | B2 | 5/2006 | De La Torre |
| 8,004,719 | B2 * | 8/2011 | Asai .................... H04N 1/4051 358/3.02 |
| 8,279,490 | B2 | 10/2012 | Asai |

(Continued)

FOREIGN PATENT DOCUMENTS

| JP | H08265566 A | * | 10/1996 |
| JP | 2003-500940 A | | 1/2003 |

(Continued)

OTHER PUBLICATIONS

English translation of JP-H08265566-A. (Year: 1996).*

*Primary Examiner* — Thomas D Lee
(74) *Attorney, Agent, or Firm* — Rimon P.C.

(57) ABSTRACT

In a threshold matrix generation method, after periodic areas are set in a matrix space and elements existing every other one in a row direction and a column direction in each periodic area is set as target elements, performed is a step of assigning threshold values ranging from one on the most highlight side to a predetermined switching threshold value sequentially to target elements in the periodic areas. Assuming that elements to which threshold values are assigned are regarded as determined elements, in the step, under a condition that the number of determined elements is almost same in the periodic areas and each determined element is positioned in a vicinity of any one determined element in each periodic area, a target element whose distance to all determined elements is largest is specified within the periodic areas and a threshold value is assigned to the target element.

8 Claims, 22 Drawing Sheets

(56) References Cited

U.S. PATENT DOCUMENTS 9,007,651 B2 * 4/2015 Asai ................ H04N 1/393
 358/3.08
9,189,716 B2 11/2015 Takahama et al.
9,387,685 B2 7/2016 Wakui

FOREIGN PATENT DOCUMENTS

| JP | 2006-028916 A | 2/2006 |
| JP | 2008-294702 A | 12/2008 |
| JP | 2011-029979 A | 2/2011 |
| JP | 2014-150510 A | 8/2014 |
| JP | 2014-192849 A | 10/2014 |
| JP | 2015-012370 A | 1/2015 |

* cited by examiner

THRESHOLD MATRIX GENERATION METHOD, IMAGE DATA GENERATION METHOD, STORAGE MEDIUM STORING PROGRAM, THRESHOLD MATRIX, AND IMAGE DATA GENERATION APPARATUS

CROSS-REFERENCE TO RELATED APPLICATIONS

The present application claims the benefit of priority to Japanese Patent Application No. 2022-27760 filed on Feb. 25, 2022, the content of which is incorporated herein by reference in its entirety.

TECHNICAL FIELD

The present invention relates to a technique for generating a threshold matrix and a technique for generating image data by using the threshold matrix.

BACKGROUND ART

Conventionally, a process has been performed, in which halftoning of a multi-tone original image is performed and a halftone dot image is printed on a base material such as paper or the like (in other words, a print image is formed). In the halftoning of the original image, used is an AM (Amplitude Modulated) screen, an FM (Frequency Modulated) screen, or the like.

Further, Japanese Patent Application Laid Open Gazette No. 2015-12370 (Document 1) discloses a method of generating a threshold matrix for N-times speed. In the method, in a matrix space, writing elements corresponding to writing positions in N-times-speed writing are set every other (N−1). Furthermore, set are a plurality of first partial areas which are distributed almost uniformly in the matrix space, each of which includes a plurality of writing elements. Turn-on numbers are assigned to two or more writing elements in each first partial area, and subsequently, turn-on numbers are assigned to the remaining writing elements. After that, in accordance with the turn-on number, a threshold value of each writing element is determined and a threshold matrix for N-times speed is thereby obtained. Japanese Patent Application Laid Open Gazette No. 2014-150510 (Document 2) shows that by actively aggregating dots in a low-to-middle density tonal range, the robustness against stripe moire peculiar to a single pass method is increased.

In the FM screen, the graininess in a highlight area of a print image is deteriorated as compared with that in the AM screen. On the other hand, in the AM screen, since the area in which dots overlap each other in the highlight area of the print image is larger than that of the FM screen, it is impossible to efficiently change a density in a tone change on the highlight side (in other words, impossible to ensure an increase in the efficiency of dot gain). Further, since the cycle of the AM screen is constant, the AM screen is inferior to the FM screen in that a line breakage occurs in detail reproduction, or the like.

SUMMARY OF THE INVENTION

The present invention is intended for a threshold matrix generation method for generating a threshold matrix to be compared with a multi-tone original image in performing halftoning of the original image, and it is an object of the present invention to improve the graininess in a highlight area and efficiently change a density in a tone change on a highlight side without loss of reproduction in a shadow part of a print image.

The threshold matrix generation method according to the present invention includes a) preparing a matrix space which is a set of elements arranged in a row direction and a column direction, b) setting a plurality of periodic areas disposed periodically and distributed uniformly in the matrix space, each of the plurality of periodic areas including a plurality of elements, c) setting elements existing every other one in the row direction and the column direction in at least each periodic area, as target elements, d) assigning threshold values ranging from one on a most highlight side to a predetermined switching threshold value sequentially to target elements included in the plurality of periodic areas, and e) assigning remaining threshold values sequentially to remaining elements to each of which no threshold value is assigned after the operation d), and in the threshold matrix generation method, assuming that elements to which threshold values are assigned are regarded as determined elements, when each threshold value is assigned in the operation d), under a condition that the number of determined elements is almost same in the plurality of periodic areas and each determined element is positioned in a vicinity of any one determined element in each periodic area, in consideration of repetitive application of the threshold matrix in performing halftoning of the original image, a target element whose distance to all determined elements is largest is specified within the plurality of periodic areas and the each threshold value is assigned to the target element.

According to the present invention, it is possible to improve the graininess in a highlight area and efficiently change a density in a tone change on a highlight side without loss of reproduction in a shadow part of a print image.

Preferably, a target element adjacent to any one determined element is specified and a threshold value is assigned to the target element in the operation d).

Preferably, when each threshold value is assigned in the operation e), in consideration of repetitive application of the threshold matrix in performing halftoning of the original image, an element whose distance to all determined elements is largest is specified and the each threshold value is assigned to the element.

Preferably, elements existing every other one in the row direction and the column direction in the matrix space are set as target elements in the operation c), and the operation e) includes e1) assigning threshold values ranging from one next to the switching threshold value to another switching threshold value sequentially to target elements among the remaining elements and e2) assigning threshold values ranging from one next to the another switching threshold value to one on a most shadow side sequentially to remaining elements to each of which no threshold value is assigned after the operation e1).

Preferably, by repeating the operation a) to the operation e), a threshold matrix for a first color component and a threshold matrix for a second color component are generated, and in generation of the threshold matrix for the first color component, in the operation d), a position of a target element to which a threshold value on the most highlight side is first assigned is different from that in generation of the threshold matrix for the second color component.

Preferably, by repeating the operation a) to the operation e), a threshold matrix for a first color component and a threshold matrix for a second color component are generated, and an arrangement, a shape, or a size of the plurality of periodic areas in generation of the threshold matrix for the first color component is different from that in generation of the threshold matrix for the second color component.

The present invention is also intended for an image data generation method for generating image data. The image data generation method according to the present invention includes preparing a threshold matrix generated by the above-described threshold matrix generation method and generating halftone dot image data in which said multi-tone original image is halftoned by comparing said original image with said threshold matrix.

The present invention is still also intended for a non-transitory storage medium storing a program to cause a computer to generate a threshold matrix to be compared with a multi-tone original image in performing halftoning of the original image. The program according to the present invention is executed by a computer to cause the computer to perform a) preparing a matrix space which is a set of elements arranged in a row direction and a column direction, b) setting a plurality of periodic areas disposed periodically and distributed uniformly in the matrix space, each of the plurality of periodic areas including a plurality of elements, c) setting elements existing every other one in the row direction and the column direction in at least each periodic area, as target elements, d) assigning threshold values ranging from one on a most highlight side to a predetermined switching threshold value sequentially to target elements included in the plurality of periodic areas, and e) assigning remaining threshold values sequentially to remaining elements to each of which no threshold value is assigned after the operation d), and in the storage medium, assuming that elements to which threshold values are assigned are regarded as determined elements, when each threshold value is assigned in the operation d), under a condition that the number of determined elements is almost same in the plurality of periodic areas and each determined element is positioned in a vicinity of any one determined element in each periodic area, in consideration of repetitive application of the threshold matrix in performing halftoning of the original image, a target element whose distance to all determined elements is largest is specified within the plurality of periodic areas and the each threshold value is assigned to the target element.

The present invention is yet also intended for a threshold matrix to be compared with a multi-tone original image in performing halftoning of the original image. In the threshold matrix according to the present invention, when a plurality of halftone tint images having respective tone values ranging from one on a most highlight side to a predetermined switching tone value are generated, in the plurality of halftone tint images, dots are formed only in target pixels existing every other one in a row direction and a column direction in a plurality of periodic areas disposed periodically and distributed uniformly, each of the plurality of periodic areas including a plurality of pixels, and a position to which a dot is added in a transition from a halftone tint image having one tone value to a halftone tint image having a next tone value among the plurality of halftone tint images is a target pixel whose distance to all already-existing dots is largest, under a condition that the number of dots is almost same in the plurality of periodic areas and each dot is positioned in a vicinity of any one dot in each periodic area in each halftone tint image.

The present invention is further intended for an image data generation apparatus for generating image data. The image data generation apparatus according to the present invention includes a matrix storage part storing the above-described threshold matrix and an image data generator for generating halftone dot image data in which a multi-tone original image is halftoned by comparing the original image with the threshold matrix.

These and other objects, features, aspects and advantages of the present invention will become more apparent from the following detailed description of the present invention when taken in conjunction with the accompanying drawings.

DETAILED DESCRIPTION

Figure 1:
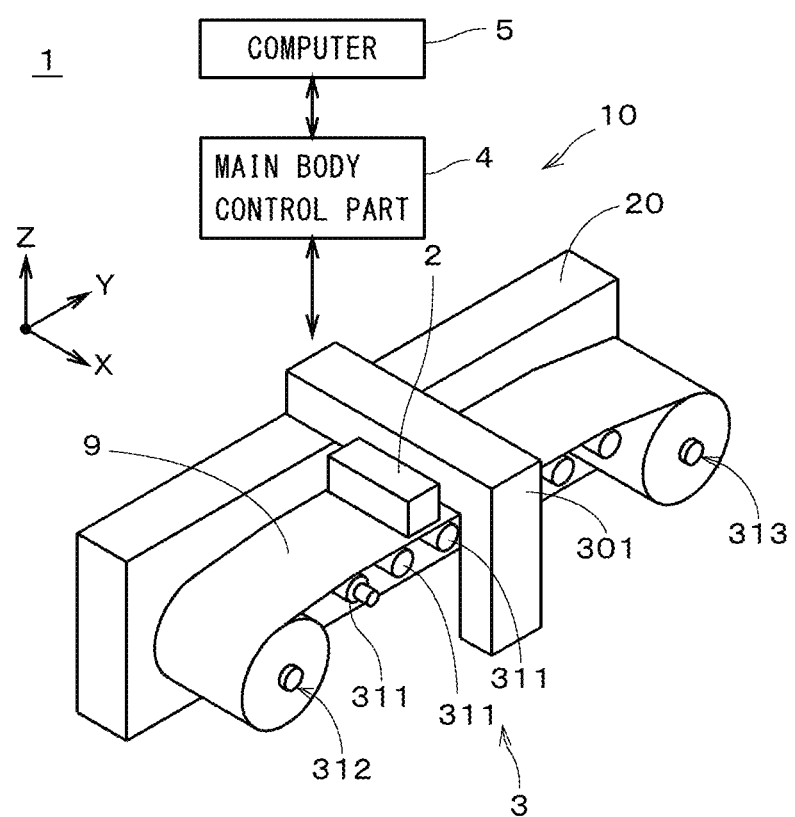
FIG. 1 is a view showing a configuration of a printer.

FIG. 1 is a view showing a configuration of a printer 1 in accordance with one preferred embodiment of the present invention. The printer 1 performs color printing on a base material such as longitudinal printing paper or a film by an inkjet method. The base material is not limited to paper but hereinafter referred to as "printing paper 9". In the printer 1, for example, images are printed in a plurality of areas on the printing paper 9 corresponding to a plurality of pages. The printer 1 may perform monochrome printing.

The printer 1 shown in FIG. 1 includes a main body 10 and a computer 5 connected to the main body 10. The main body 10 includes an ejection part 2 for ejecting droplets of ink toward the printing paper 9, a moving mechanism 3 for moving the printing paper 9 toward the (−Y) direction of FIG. 1 below the ejection part 2, and a main body control part 4 connected to the ejection part 2 and the moving mechanism 3.

In the moving mechanism 3, a plurality of rollers 311 each elongated in the X direction (which corresponds to the width of the printing paper 9 and hereinafter, is referred to as a "width direction") are arranged in the Y direction. On the (+Y) side of the plurality of rollers 311, provided is a feeding part 313 for holding a roll of the printing paper 9 before printing and for feeding the printing paper 9 from the roll in the (−Y) direction. On the (−Y) side of the plurality of rollers 311, provided is a winding part 312 for winding and holding portions of the printing paper 9, on which printing has been performed, in a roll state. In the moving mechanism 3, between the feeding part 313 and the winding part 312, each portion of the printing paper 9 is continuously moved in the Y direction. The moving mechanism 3 is supported by a side wall portion 20. In the following description, the Y direction is also referred to as a "moving direction". Further, in the description on the printer 1, the printing paper 9 which is simply described thus refers to a portion of the printing paper 9 being moved (in other words, a portion of the printing paper 9 on the plurality of rollers 311).

The ejection part 2 is attached to a frame 301 provided across the printing paper 9 in the width direction. The ejection part 2 includes a plurality of (four in the present preferred embodiment) head parts. The plurality of head parts eject inks of colors, i.e., K (black), C (cyan), M (magenta), and Y (yellow), respectively, and are arranged in the Y direction. In each of the head parts, a plurality of ejection ports are arranged in the width direction. Assuming that the plurality of ejection ports which are aligned are regarded as an ejection port row, for example, a plurality of ejection port rows are arranged in the Y direction. As to the width direction, in one ejection port row, between two ejection ports adjacent to each other, one ejection port of the other ejection port row is disposed. It thereby becomes possible to form a plurality of dots aligned in the width direction at a pitch not larger than the pitch of the ejection ports in each ejection port row. The ejection part 2 may include a head part for ejecting ink of any other color.

In the head part, for each ejection port, for example, provided is a piezoelectric liquid ejection element, and by driving the liquid ejection element, the droplets of ink are ejected toward the printing paper 9 from each ejection port. Actually, the plurality of ejection ports are aligned across the whole of the width of a printing area on the printing paper 9 in the width direction, and when the printing paper 9 passes below the head parts only one time, printing of an image on the printing paper 9 is completed. In other words, the printer 1 can perform a high-speed image printing by a single pass method. The printer 1 may perform printing by any method other than the single pass method. The liquid ejection element is not limited to a piezoelectric system but may adopt, for example, a system such as a thermal system in which air bubble is generated inside a pressure chamber by heating, or the like.

Figure 2:
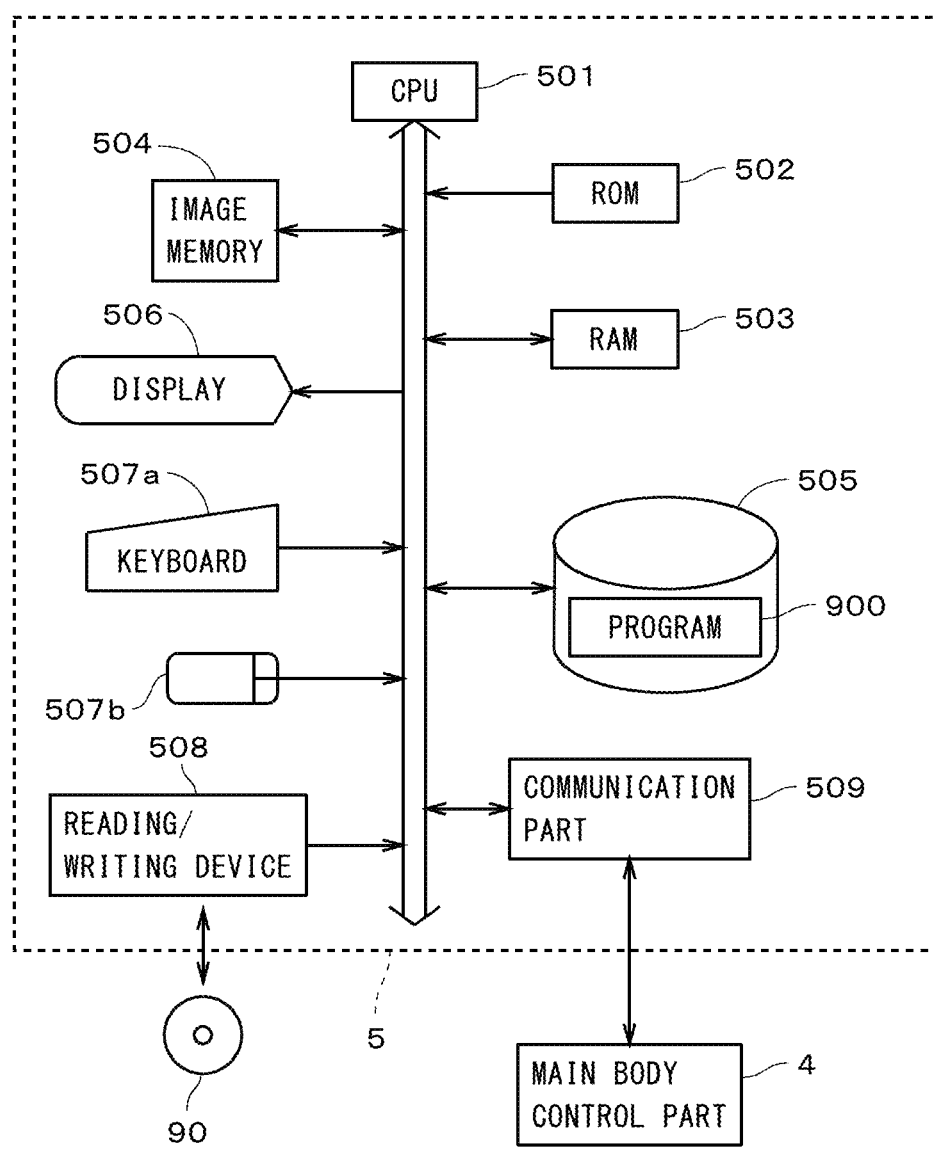
FIG. 2 is a view showing a constitution of a computer.

FIG. 2 is a view showing a constitution of a computer 5. The computer 5 has a constitution of a general computer system including a CPU 501 for performing various arithmetic operations, a ROM 502 for storing therein a basic program, and a RAM 503 for storing therein various information. The computer 5 further includes an image memory 504 for storing therein data of an color original image, a fixed disk 505 for storing therein information, a display 506 for displaying various information thereon, a keyboard 507a and a mouse 507b for receiving an input from an operator, a reading/writing device 508 for reading information from a non-transitory computer-readable storage medium 90 such as an optical disk, a magnetic disk, a magneto-optic disk, or the like and for writing information into the storage medium 90, and a communication part 509 for making communication with the main body control part 4.

In the computer 5, a program 900 is read out from the storage medium 90 through the reading/writing device 508 and stored in the fixed disk 505 in advance. The program 900 may be stored in the fixed disk 505 via a network. When the CPU 501 performs an arithmetic operation in accordance with the program 900 (in other words, the computer 5 executes the program) while using the RAM 503 and the fixed disk 505, the computer 5 performs an operation, serving as an operation part for generating a threshold matrix (also referred to as an SPD (Screen Pattern Data)) used for halftoning of the original image. The generated threshold matrix is transferred to the main body control part 4 through the communication part 509.

Figure 3:
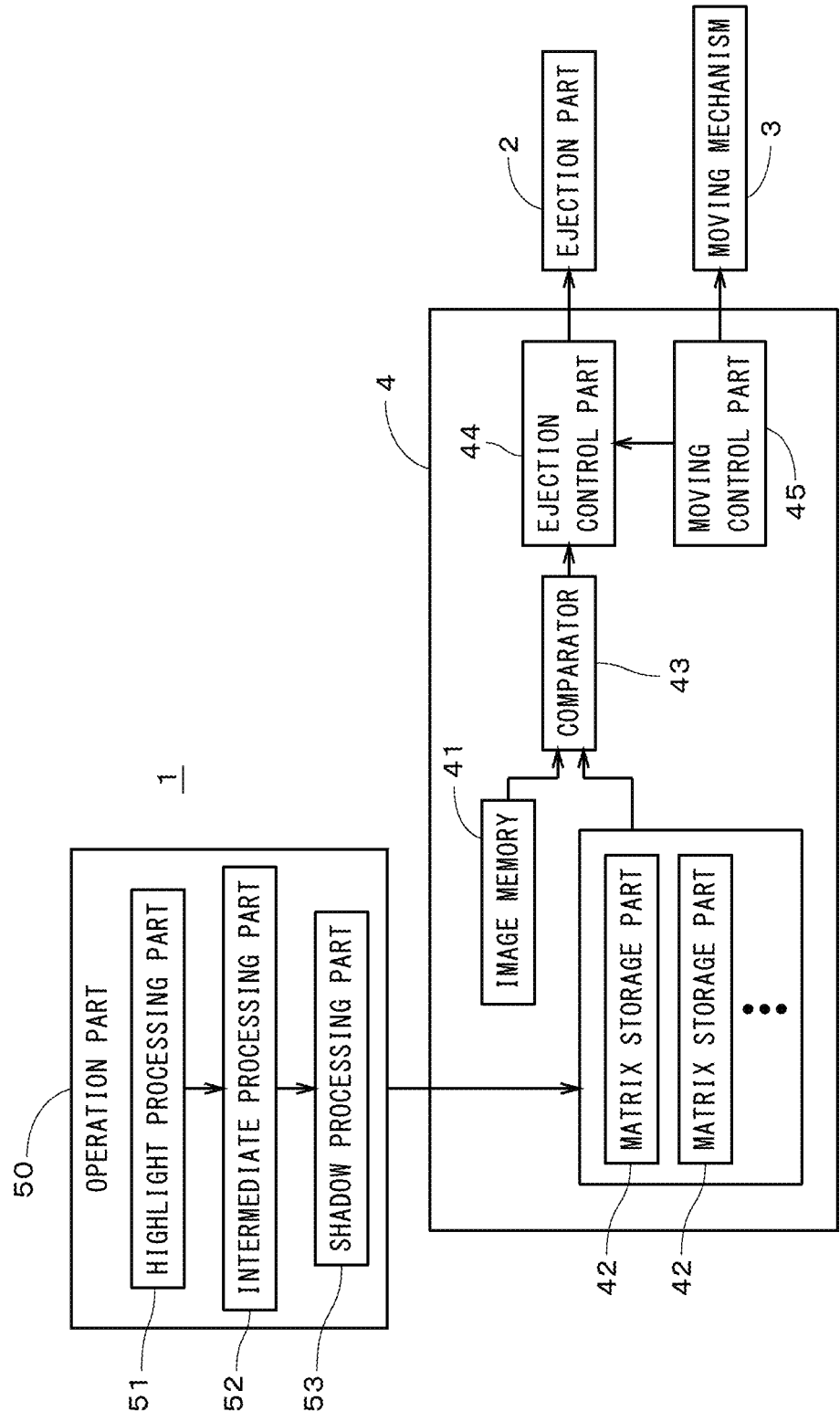
FIG. 3 is a block diagram showing a functional constitution of the printer.

FIG. 3 is a block diagram showing a functional constitution of the printer 1. A highlight processing part 51, an intermediate processing part 52, and a shadow processing part 53 in an operation part 50 of FIG. 3 are functions implemented by the computer 5. The details of the functions of the highlight processing part 51, the intermediate processing part 52, and the shadow processing part 53 will be described later. The functions of the operation part 50 may be implemented by dedicated electric circuits, or may be partially implemented by the dedicated electric circuits. Further, the operation part 50 may be implemented by cooperation of a plurality of computers, and in this case, the plurality of computers may be provided at positions away from one another.

The main body control part 4 includes an image memory 41, a plurality of matrix storage parts 42, a comparator 43, a moving control part 45, and an ejection control part 44. The image memory 41 stores therein data of a color original image. The plurality of matrix storage parts 42 are memories which store therein the threshold matrices for a plurality of color components, respectively. The comparator 43 is a halftoning circuit for comparing the original image with the threshold matrix for each color component. The moving control part 45 controls the moving mechanism 3 which moves the printing paper 9. The ejection control part 44 controls ejection of ink from the plurality of ejection ports in the ejection part 2 in synchronization with the moving of the printing paper 9.

Figure 4:
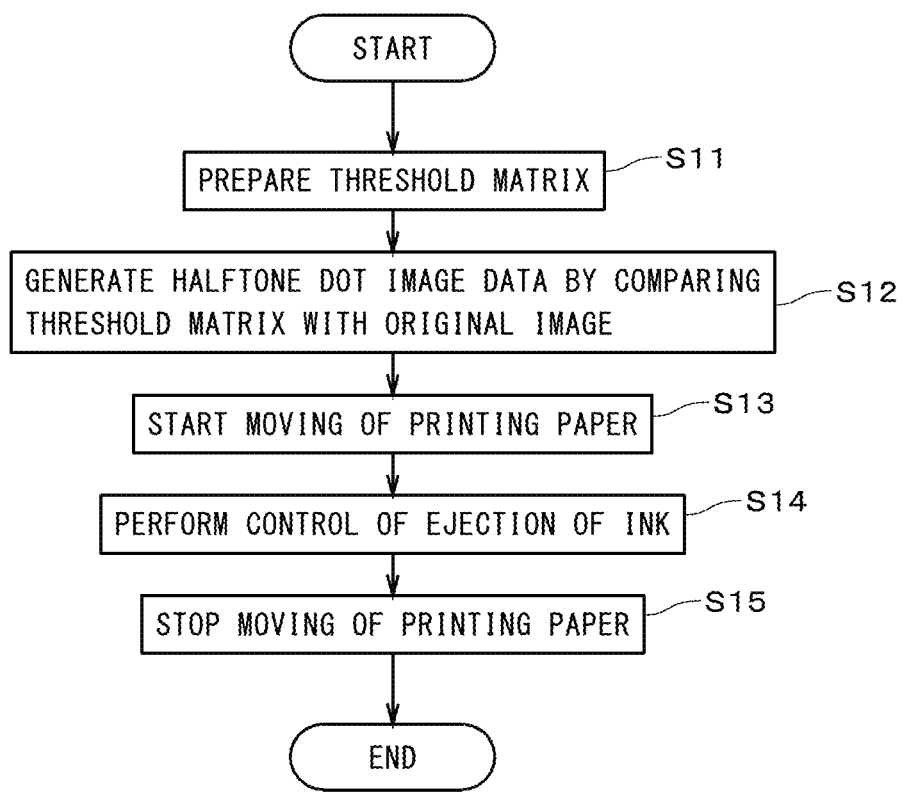
FIG. 4 is a flowchart showing an operation flow for printing an image.

Next, an operation of the printer 1 for printing an image will be described with reference to FIG. 4. First, the threshold matrices to be used for printing are outputted from the computer 5 (operation part 50) to the main body control part 4 (may be outputted in advance) and stored in the matrix storage parts 42 of FIG. 3, being prepared (Step S11). An operation for generating the threshold matrices will be described later. Further, the color original image is inputted from the computer 5 or an external computer to the main body control part 4 and stored in the image memory 41.

Figure 5:
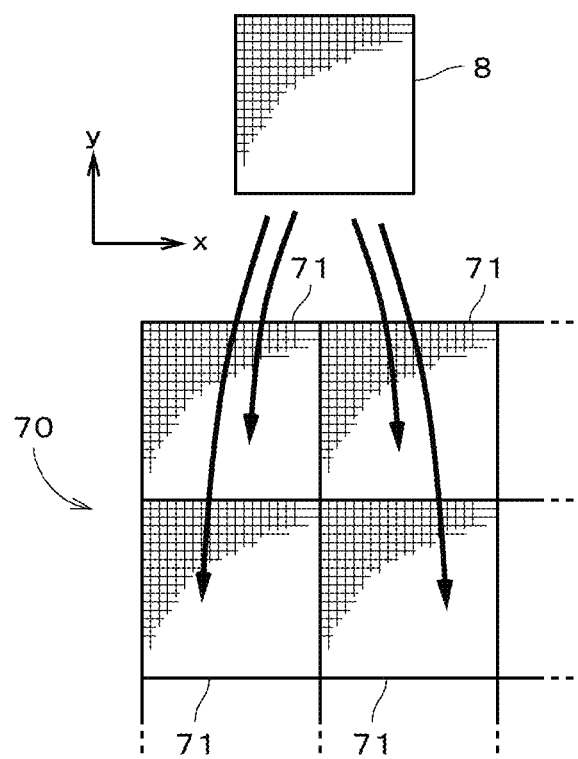
FIG. 5 is a view showing a threshold matrix and an original image.

FIG. 5 is a view abstractly showing the threshold matrix 8 and the original image 70. Though only the threshold matrix 8 for one color component is shown in FIG. 5, the same applies to other color components. In the threshold matrix 8, a plurality of elements are arranged in a row direction corresponding to the width direction (shown as the x direction in FIG. 5) and in a column direction corresponding to the moving direction (shown as the y direction in FIG. 5). Also in the original image 70, a plurality of pixels are arranged (the same applies to a halftone dot image described later) in a direction corresponding to the width direction (hereinafter, referred to as the "row direction" like in the threshold matrix 8) and in a direction corresponding to the moving direction (hereinafter, referred to as the "column direction" like in the threshold matrix 8). In the following description, it is assumed that the original image is represented by tone values (integer values) ranging from 0 to 255. As a matter of course, the number of tone levels of the original image may be 4096 or the like and may be arbitrarily determined.

Subsequently, the comparator 43 which is an image data generator compares the original image 70 stored in the image memory 41 with respect to each color component with the threshold matrix 8 stored in the matrix storage part 42. The original image 70 is thereby halftoned (in other words, halftone screening is performed thereon), and halftone dot image data (hereinafter, referred to simply as a "halftone dot image") to be used for printing in the printer 1 is generated (Step S12).

Herein, halftoning of the original image 70 will be described. In halftoning of the original image 70, a repeat area 71 serving as a unit of halftoning, which is obtained by dividing the original image 70 into a lot of areas having the same size, is set as shown in FIG. 5. Each matrix storage part 42 has a storage area which corresponds to one repeat area 71 and stores therein the threshold matrix 8 by setting a threshold value to each address (coordinates) of this storage area. Then, conceptually, by causing each repeat area 71 of the original image 70 and the threshold matrix 8 for each color component to overlap each other and comparing the tone value of the color component of each pixel in the repeat area 71 with the corresponding threshold value of the threshold matrix 8, it is determined whether or not writing (formation of dot of the color) is performed on the position of the pixel on the printing paper 9.

Actually, on the basis of an address signal from an address generator included in the comparator 43 shown in FIG. 3, a tone value of one pixel of the original image 70 for each color component is read out from the image memory 41. On the other hand, in the address generator, an address signal indicating a position in the repeat area 71 corresponding to the pixel in the original image 70 is also generated, and one threshold value in the threshold matrix 8 for each color component is specified and read out from the matrix storage part 42. Then, the comparator 43 compares the tone value from the image memory 41 with the threshold value from the matrix storage part 42 for each color component, to thereby determine a tone value of a position (address) of the pixel in a binary halftone dot image (output image) for each color component.

Therefore, when paying attention to one color component, in the multi-tone (continuous-tone) original image 70 of FIG. 5, to a position having a tone value larger than the corresponding threshold value of the threshold matrix 8, e.g., a tone value of "1" is given (in other words, a dot is placed), and to the remaining pixels, a tone value of "0" is given (no dot is placed). Thus, in the main body control part 4 which is an image data generation apparatus, the original image 70 is halftoned by using the threshold matrix 8, and the halftone dot image data indicating ON/OFF of ink ejection from the plurality of ejection ports is generated.

In the printer 1 of FIG. 1, concurrently with the above-described halftoning process (halftone dot image data generation process), an image is printed on the printing paper 9. Specifically, the moving control part 45 drives the moving mechanism 3 to cause the printing paper 9 to start moving in the moving direction (Step S13), and the ejection control part 44 controls ink ejection from the plurality of ejection ports included in each head part of the ejection part 2 in synchronization with moving of the printing paper 9 (Step S14).

Herein, since the halftone dot image is an image printed on the printing paper 9, it can be understood that a plurality of pixels of the halftone dot image are set, being arranged on the printing paper 9. Further, a plurality of pixel positions in the row direction of the halftone dot image correspond to the plurality of ejection ports of each head part, respectively. In the ejection control part 44, concurrently with moving of the ejection part 2 relative to the printing paper 9, when the tone value of the halftone dot image corresponding to an ejection position of each ejection port on the printing paper 9 is "1", a dot is formed at the ejection position, and when the tone value is "0", no dot is formed at the ejection position. Thus, with respect to each of K, C, M, and Y, in accordance with the tone values of the halftone dot image corresponding to the ejection positions of the plurality of ejection ports on the printing paper 9, ink ejection from the plurality of ejection ports are controlled.

In the printer 1, with respect to K, C, M, and Y, the operation of generating the halftone dot image and the operation of printing the halftone dot image on the printing paper 9 are concurrently performed, to thereby print a color halftone dot image representing the color original image on the printing paper 9. After the whole of the halftone dot image is printed on the printing paper 9, the moving of the printing paper 9 is stopped and the printing operation in the printer 1 is completed (Step S15). In the following description, the halftone dot image printed on the printing paper 9 is referred to as a "print image".

Next, a process of generating the threshold matrix 8 used in the printer 1 will be described with reference to FIG. 6. As already described, the threshold matrix 8 is to be compared with the multi-tone original image 70 in performing halftoning of the original image 70. Though attention is paid to only one color component among the color components of K, C, M, and Y in the description on generation of the threshold matrix 8, the same applies to the other color components. As a matter of course, the threshold matrix 8 for any color component other than K, C, M, or Y may be generated.

In the operation part 50 of FIG. 3, a storage area corresponding to the above-described repeat area 71 is prepared as a matrix space (Step S21). The matrix space is a set of elements (matrix elements) arranged in the row direction and the column direction. In each element, one threshold value can be stored. In the following process steps, by setting a threshold value to each element in the matrix space, the threshold matrix 8 is generated.

Figure 7:
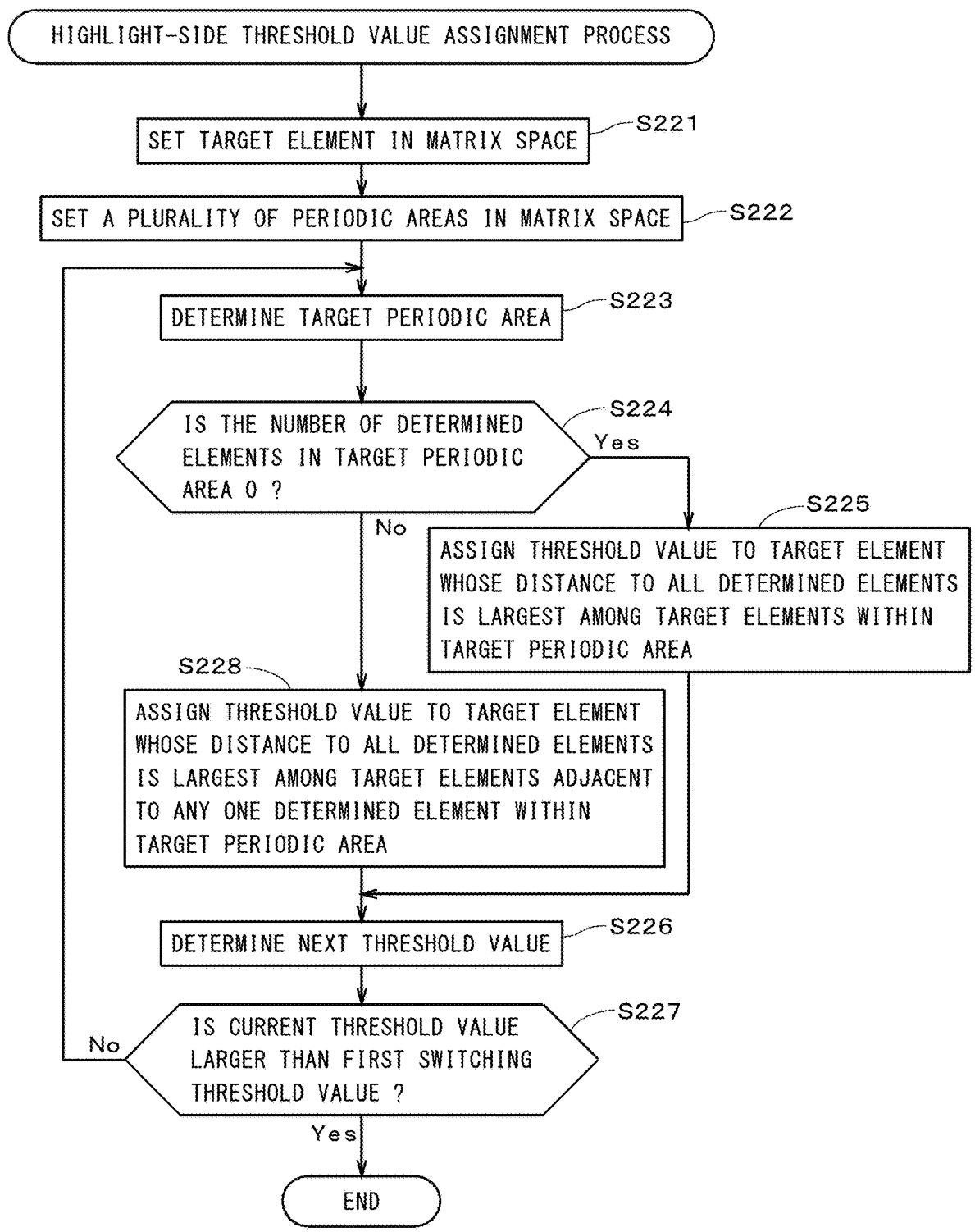
FIG. 7 is a flowchart showing an operation flow of a highlight-side threshold value assignment process.
Figure 8:
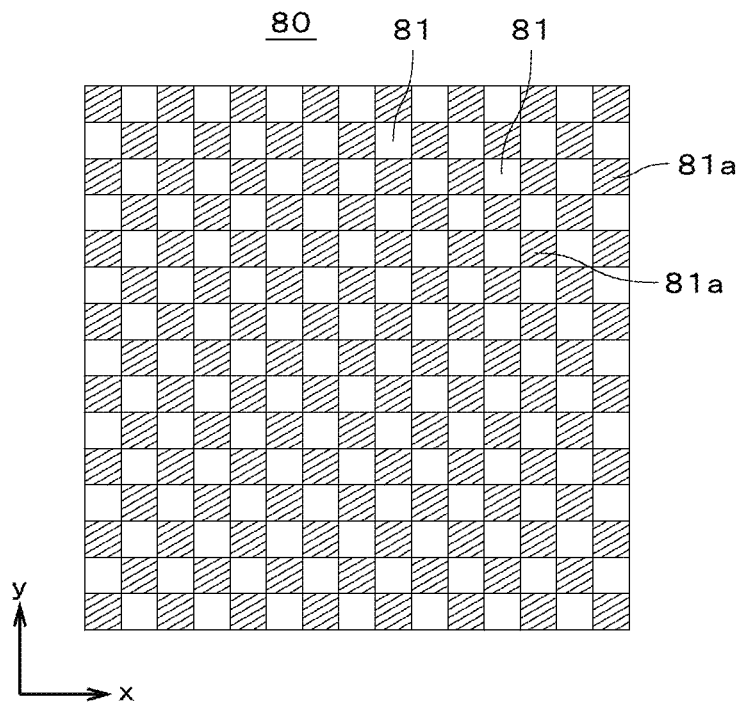
FIG. 8 is a view showing a matrix space.

Subsequently, by the highlight processing part 51 of the operation part 50, performed is a process of assigning threshold values on the highlight side to elements in the matrix space (hereinafter, referred to as a "highlight-side threshold value assignment process") (Step S22). FIG. 7 is a flowchart showing an operation flow of the highlight side threshold value assignment process. In the highlight processing part 51, as shown in FIG. 8, first, elements 81 existing every other one in the row direction and the column direction in the whole matrix space 80 are set as target elements 81a (Step S221). In FIG. 8, part of the matrix space 80 is shown and the target elements 81a are hatched (the same applies to FIGS. 9, 12, and 14 described later). Assuming that the elements 81 other than the target elements 81a are referred to as "non-target elements", the target elements 81a and the non-target elements are alternately arranged in the row direction and the target elements 81a and the non-target elements are alternately arranged also in the column direction. Thus, the target elements 81a and the non-target elements are arranged in a checkerboard-like manner (checkered pattern).

Figure 9:
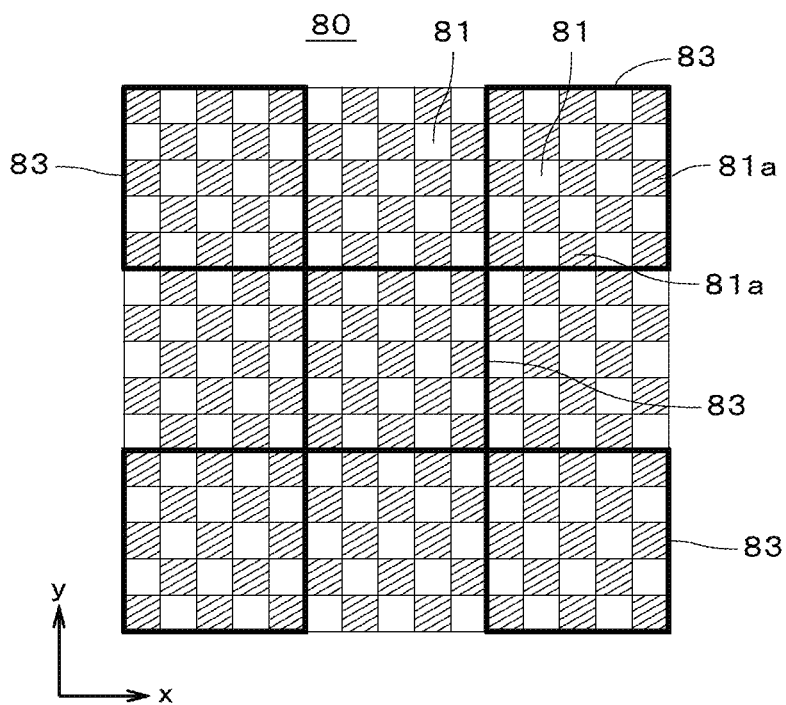
FIG. 9 is a view showing the matrix space.

Further, as shown in FIG. 9, a plurality of periodic areas 83 are set in the matrix space 80 (Step S222). In FIG. 9, each periodic area 83 is surrounded by a thick line. Each periodic area 83 includes a plurality of elements 81. Typically, each periodic area 83 is an area consisting of elements 81 in M rows and L columns (M and L are each an integer of two or more), and the plurality of periodic areas 83 have the same size and shape. In the exemplary case of FIG. 9, each periodic area 83 is a square area consisting of elements 81 in five rows and five columns and includes thirteen target elements 81a and twelve non-target elements. The plurality of periodic areas 83 are disposed periodically (regularly) and distributed uniformly in the matrix space 80. Preferably, the plurality of periodic areas 83 are arranged at regular intervals in each of the row direction and the column direction. In the exemplary case of FIG. 9, the width of a gap between two periodic areas 83 adjacent to each other in the row direction is equal to the width of the periodic area 83 in the row direction. Similarly, the width of a gap between two periodic areas 83 adjacent to each other in the column direction is equal to the width of the periodic area 83 in the column direction.

After the target elements 81a and the periodic areas 83 are set in the matrix space 80, the highlight processing part 51 assigns threshold values ranging from one on the most highlight side to a predetermined first switching threshold value sequentially to the target elements 81a included in the plurality of periodic areas 83. In detail, first, assuming that the threshold value (initial value) on the most highlight side is a current threshold value, the periodic area 83 to be used in assigning the current threshold value is determined a target periodic area 83 (Step S223). Herein, assuming that the elements to which the threshold values are assigned are referred to as "determined elements", the target periodic area 83 is a periodic area 83 in which the number of determined elements is smaller than that in any other periodic area 83. In the first assignment of the threshold value, since any periodic area 83 does not include the determined element, all the periodic areas 83 are target periodic areas 83.

Subsequently, in the plurality of target periodic areas 83, determined is a target element 81a to which the current threshold value is to be assigned. Herein, since the number of determined elements in each target periodic area 83 is 0 (Step S224) and any periodic area 83 does not include the determined element, the target element 81a to which the threshold value is to be assigned is determined in a random manner. Then, to the target element 81a, the current threshold value, i.e., the threshold value on the most highlight side is assigned (Step S225). Further, assignment of the threshold value to the element 81 can be understood as arrangement of a dot in the element 81.

In the present preferred embodiment, the original image is represented by tone values ranging from 0 to 255, and in this case, the threshold value on the most highlight side is 0 and the threshold value on the most shadow side is 254. Further, each of integer values ranging from 0 to 254 is assigned to the elements 81 of almost the same number (specifically, the number representing an integer part of a value obtained dividing the number of elements in the matrix space 80 by 255 or the number representing a value obtained by adding 1 to the integer part), as a threshold value. Furthermore, the number of elements 81 to which each value from 0 to 254 is assigned does not necessarily need to be almost the same in the values 0 to 254 but may be different depending on characteristics or the like of the ink used in the printer 1. For example, the number of elements 81 to which a threshold value on the highlight side is assigned may be smaller than that to which a threshold value on the shadow side is assigned. In the following description, the number of elements 81 to which each value in the entire range (herein, 0 to 254) of the threshold values is assigned is referred to as a "setting number".

Herein, since the current threshold value is not assigned yet to a setting number of elements 81, the current threshold value is determined as a next threshold value (in other words, a next current threshold value) (Step S226). Subsequently, the current threshold value is compared with the already-described first switching threshold value. Assuming that the threshold value on the most highlight side is 0% and the threshold value on the most shadow side is 100%, the first switching threshold value is a value not larger than 25% (in the present exemplary process, the value is any value from 0 to 63 and hereinafter, is represented as a "value not larger than 25% in the entire threshold value range", and the same applies to the following). Preferably, the first switching threshold value is a value not smaller than 15% in the entire threshold value range, and more preferably, a value not smaller than 18% in the entire threshold value range (the reason will be described later).

Since the current threshold value is not larger than the first switching threshold value (Step S227), the process goes back to Step S223 and the target periodic area 83 is determined. Since the target periodic area 83 is a periodic area 83 in which the number of determined elements is smaller than that in any other periodic area 83 as already described, the periodic area 83 other than the periodic areas 83 each including the target element 81a to which the threshold value is assigned in above-described Step S225 is determined as the target periodic area 83.

After it is checked that the number of determined elements is 0 in the target periodic area 83 (Step S224), the target element 81a to which the current threshold value is to be assigned is determined. Specifically, a target element 81a of which the threshold value is not determined, whose distance to all the determined elements is largest, is specified within the plurality of target periodic areas 83. At that time, assuming that also in the 8 neighborhood of the matrix space 80, the same matrix spaces 80 are disposed, in the central matrix space 80, a target element 81a whose distance to all the determined elements is largest (within the target periodic area 83) is specified. Thus, in specifying the target element 81a, considered is repetitive application of the threshold matrix 8 in performing halftoning of the original image 70. In specifying a target element 81a whose distance to all the determined elements is largest, for example, the same equation as Eq. 1 in Japanese Patent Application Laid Open Gazette No. 2015-12370 (above-described Document 1) which is incorporated herein by reference can be used (the same applies to Steps S232 and S242 described later). Then, the current threshold value is assigned to the specified target element 81a (Step S225).

Step S223 to S225 described above are repeated until the current threshold value is assigned to the setting number of elements 81 (Steps S226 and S227). After the current threshold value is assigned to the setting number of elements 81, a value obtained by adding 1 to the current threshold value is determined as the next threshold value (in other words, the next current threshold value (Step S226). Then, until the current threshold value is assigned to a setting number of elements 81, above-described Steps S223 to S225 are repeated (Steps S226 and S227).

In Step S223 in the repetition of above-described Steps S223 to S225, after one target element 81*a* is determined as the determined element in all the periodic areas 83, since there is no periodic area 83 in which the number of determined elements is smaller than that in any other periodic area 83, all the periodic areas 83 are determined as the target periodic areas 83. Further, since the number of determined elements is not 0 in the target periodic area 83 (Step S224), only the target element 81*a* (of which the threshold value is not determined) which is adjacent to the determined element, i.e., the target element 81*a* adjacent to the determined element in a diagonal direction becomes a candidate for the target element 81*a* to which the current threshold value is to be assigned. Then, among the target elements 81*a* adjacent to any one determined element within the target periodic area 83, a target element 81*a* whose distance to all the determined elements is largest is specified and the current threshold value is assigned to the target element 81*a* (Step S228). Thus, when the number of determined elements in the target periodic area 83 is not smaller than 1, a process step of Step S228, instead of Step S225, is performed.

In the following process steps, in a case where the current threshold value is assigned to the setting number of elements 81, above-described Steps S223, S224, and S228 are repeated while a value obtained by adding 1 to the current threshold value is determined as the next threshold value (Steps S226 and S227). In Step S223 in the repetition of above-described Steps S223, S224, and S228, as already described, the periodic area(s) 83 in which the number of determined elements is smaller than that in any other periodic area 83 is determined as the target periodic area 83. In Step S228, the current threshold value is assigned to the target element 81*a* whose distance to all the determined elements is largest among the target elements 81*a* adjacent to any one determined element within the target periodic area(s) 83.

Figure 10:
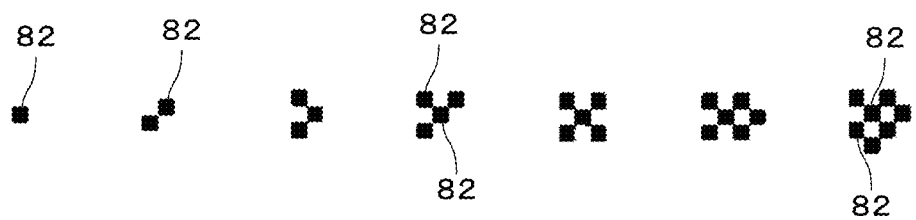
FIG. 10 is a view showing a manner in which the number of determined elements increases.

FIG. 10 is a view showing an exemplary manner in which the number of determined elements 82 increases in one periodic area 83. In FIG. 10, the determined element 82 (the element 81 to which the threshold value is assigned) is blackened. In other words, a dot is disposed in the determined element 82 (the same applies to other figures showing the matrix space 80). Further, the number of repetitions of Steps S223, S224, and S228 increases from one determined element 82 on the leftmost side toward a cluster of the determined elements 82 (a cluster of the dots) on the rightmost side. As shown in FIG. 10, in accordance with the increase in the number of repetitions of Steps S223, S224, and S228, the cluster of the dots becomes larger (grows). As already described, in Step S228, since the target element 81*a* to which the threshold value is to be assigned is specified from the target elements 81*a* adjacent to any one determined element 82, each determined element 82 is adjacent to any one determined element 82 in each periodic area 83.

Figure 11:
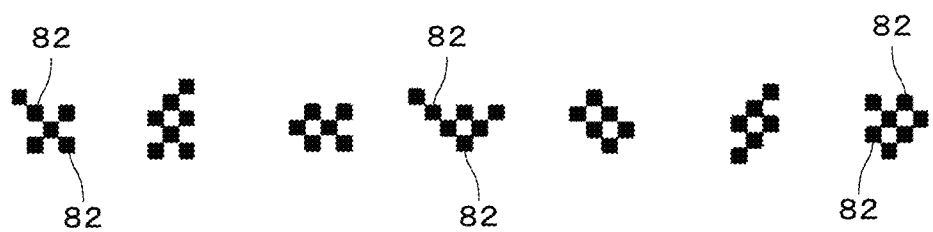
FIG. 11 is a view showing a cluster of determined elements in a plurality of periodic areas.

FIG. 11 is a view showing clusters of the determined elements 82 in the plurality of periodic areas 83, which are arranged in line, and shows each cluster of the determined elements 82 in a certain stage of the highlight-side threshold value assignment process. As shown in FIG. 11, in the plurality of periodic areas 83, the arrangements of the determined elements 82 are different variously. Further, as already described, since the periodic area 83 in which the number of determined elements 82 is smaller than that in any other periodic area 83 is determined as the target periodic area 83, a difference between the maximum value and the minimum value of the number of determined elements 82 included in each periodic area 83 in the same stage is 1 or 0. In other words, in assignment of each threshold value in the highlight-side threshold value assignment process, the numbers of determined elements 82 are almost the same in the plurality of periodic areas 83.

In a case where an image having a uniform tone value which is larger than the threshold value in the above-described stage by 1 is halftoned by using the threshold matrix 8 (in other words, a halftone tint image having the tone value is generated by using the threshold matrix 8), each set of the determined elements 82 shown in FIG. 11 represents an arrangement of dots in an area (hereinafter, similarly referred to as a "periodic area") of the halftone dot image, corresponding to each periodic area 83. Also in the halftone dot image (halftone tint image), the arrangements of the dots in the plurality of periodic areas are different variously and fluctuation is given.

Figure 12:
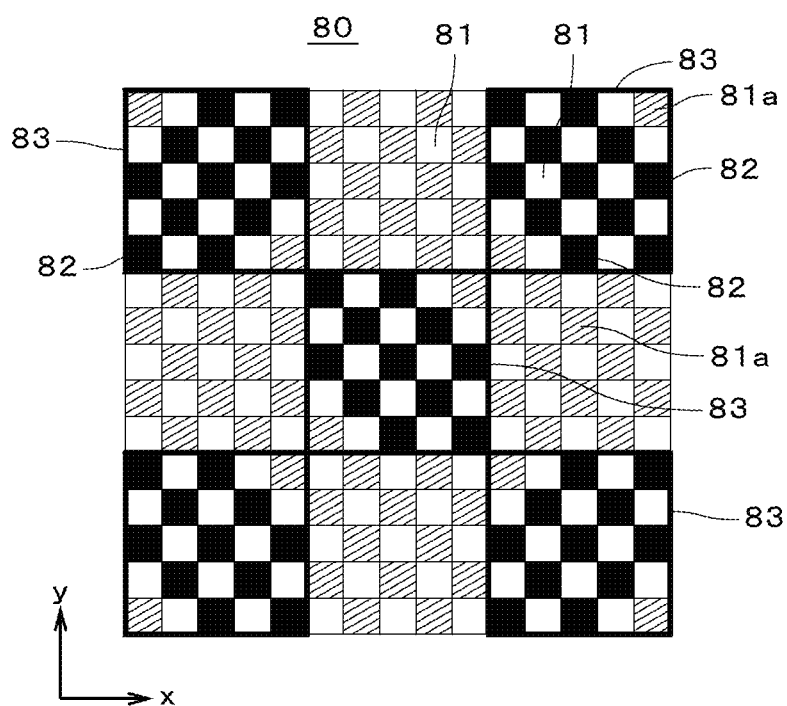
FIG. 12 is a view showing the matrix space.

In the repetition of above-described Steps S223, S224, and S228, when the current threshold value becomes larger than the first switching threshold value (Yes in Step S227), the highlight-side threshold value assignment process is ended. FIG. 12 is a view showing part of the matrix space 80 in the end of the highlight-side threshold value assignment process. As shown in FIG. 12, in the end of the highlight-side threshold value assignment process, only the target element 81*a* included in the periodic area 83 is determined as the determined element 82, and there is no determined element 82 in an area other than the periodic areas 83. Further, all the periodic areas 83 include almost the same number of determined elements 82, and the determined elements 82 in each periodic area 83 form a certain-level cluster.

Therefore, in the halftone tint image having a tone value larger than the first switching threshold value by 1, the clusters of the dots gathering in the periodic area are arranged at the same intervals as those of the periodic areas 83 in the row direction and the column direction (see the clusters of the determined elements 82 in FIG. 12). The halftone tint image having a tone value not larger than the first switching threshold value has the same characteristic feature. Thus, the threshold matrix 8 has the same characteristic feature as that of the AM screen in which halftone dots are disposed periodically. Assuming that an area consisting of pixels each having a tone value not larger than a tone value larger than the first switching threshold value by 1 is determined as a highlight area in the original image 70, in an area (hereinafter, similarly referred to as a "highlight area") of the print image corresponding to the highlight area, the visual graininess is improved, as compared with the FM screen.

Further, in the periodic area of the above-described halftone tint image, since the dots are avoided to be adjacent to each other in up-down-left-right (4-neighbor) and are adjacent in a diagonal direction, a distance between the dots becomes large. As a result, in the highlight area of the print image, it is possible to suppress occurrence of beading in which inks forming adjacent dots aggregate in a bead-like manner. Furthermore, though there occurs spread of dots due to bleeding of ink on the printing paper 9, since the distance between the adjacent dots is large, reduced is an area in which the dots overlap each other in the highlight area. As a result, in a tone change (change in the tone value not larger than the above-described tone value) on the highlight side, it becomes possible to efficiently change the density, in other words, to ensure so-called an increase in the efficiency of dot gain.

In the generation of the halftone tint image, in a case where clusters of dots having a uniform outer shape are disposed periodically like in the AM screen, when variation occurs in an ejection direction, the amount of ejection, or the like of the ink at the plurality of ejection ports in the head part of the ejection part 2 (also referred to as "printing error or the like", and hereinafter referred to as "variation in the dot position or the like"), stripe-like density unevenness or the like becomes likely to be conspicuous in the print image. On the other hand, in the threshold matrix 8, since specification of the target element 81*a* to which the threshold value is assigned in the highlight-side threshold value assignment process includes randomness like in the FM screen and the arrangement of the determined elements 82 (the outer shape of the cluster of the determined elements 82) in each periodic area 83 is not uniform (see FIG. 11), it becomes possible to suppress occurrence of the density unevenness or the like due to the variation in the dot position or the like. Further, in the print image consisting of a plurality of color components, it is also possible to suppress occurrence of moire.

Herein, the first switching threshold value will be described. Since the number of target elements 81*a* within the periodic areas 83 in the matrix space 80 is about 25% of the number of all the elements, the first switching threshold value set in the highlight-side threshold value assignment process is a value not larger than 25% in the entire threshold value range. In order to improve the graininess in the highlight area, it is preferable that a cluster of dots having a certain-degree size should be formed in each periodic area of the halftone dot image. From such a viewpoint, the first switching threshold value is preferably a value not smaller than 15% in the entire threshold value range, and more preferably a value not smaller than 18% in the entire threshold value range.

On the other hand, if the first switching threshold value is set, with which all the target elements 81*a* within each periodic area 83 become the determined elements 82 in the highlight-side threshold value assignment process, clusters of dots having the same outer shape are formed in all the periodic areas in the halftone tint image having a tone value larger than the first switching threshold value by 1. In this case, due to the variation in the dot position or the like, the density unevenness or the like becomes likely to be conspicuous in the print image. Further, in the print image consisting of a plurality of color components, there sometimes occurs moire. In order to suppress occurrence of the density unevenness, the moire, or the like in the print image, it is preferable to end the highlight-side threshold value assignment process before all the target elements 81*a* within each periodic area 83 become the determined elements 82. From such a viewpoint, the first switching threshold value is preferably a value smaller than 25% in the entire threshold value range, and more preferably a value not larger than 23% in the entire threshold value range. As described later, after the highlight-side threshold value assignment process, the element 81 in an area other than the periodic areas 83 is preferentially set as the determined element 82, and fluctuation is given to the arrangement of the determined elements 82. Further, depending on the use or the like of the printer 1, the first switching threshold value may be a value of 25% in the entire threshold value range.

Figure 13:
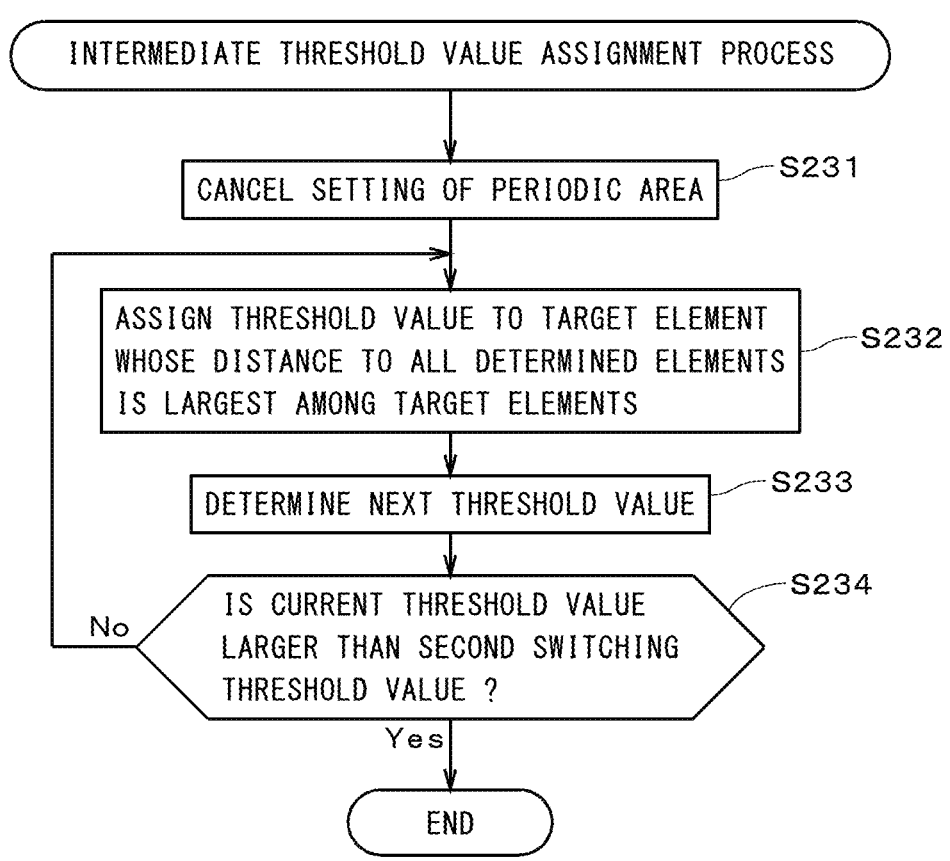
FIG. 13 is a flowchart showing an operation flow of an intermediate threshold value assignment process.

After the highlight-side threshold value assignment process is ended, the intermediate processing part 52 of the operation part 50 performs a process of assigning threshold values between the threshold value on the highlight side and the threshold value on the shadow side to the elements 81 in the matrix space 80 (hereinafter, referred to as an "intermediate threshold value assignment process") (FIG. 6: Step S23). FIG. 13 is a flowchart showing an operation flow of the intermediate threshold value assignment process. The intermediate processing part 52 first cancels setting of the periodic areas 83 in the matrix space 80 (Step S231).

Subsequently, to the target elements 81*a* among the remaining elements 81 to each of which no threshold value is assigned, the threshold values ranging from one next to the first switching threshold value (a value obtained by adding 1 to the first switching threshold value) to a predetermined second switching threshold value are sequentially assigned. Specifically, in consideration of repetitive application of the threshold matrix 8 in performing halftoning of the original image 70, a target element 81*a* of which the threshold value is not determined, whose distance to all the determined elements 82 is largest is specified from the whole of the matrix space 80. Then, assuming that the threshold value next to the first switching threshold value is determined as the current threshold value, the current threshold value is assigned to the target element 81*a* (Step S232).

Herein, since the current threshold value is not assigned yet to the setting number of elements 81, the current threshold value is determined as the next threshold value (Step S233). Subsequently, the current threshold value is compared with the already-described second switching threshold value. The second switching threshold value is larger than the first switching threshold value, being a value not larger than 50% in the entire threshold value range (not larger than 127 in the present exemplary process). The second switching threshold value is preferably a value not smaller than 35% in the entire threshold value range, and more preferably a value not smaller than 40% in the entire threshold value range (the reason will be described later). Since the current threshold value is not larger than the second switching threshold value (Step S234), the process goes back to Step S232 and the current threshold value is assigned to the target element 81*a* whose distance to all the determined elements 82 is largest.

Above-described Step S232 is repeated until the current threshold value is assigned to the setting number of elements 81 (Steps S233 and S234). After the current threshold value is assigned to the setting number of elements 81, a value obtained by adding 1 to the current threshold value is determined as the next threshold value (in other words, the next current threshold value) (Step S233). Then, until the current threshold value is assigned to the setting number of elements 81, above-described Step S232 is repeated (Steps S233 and S234). Thus, in a case where the current threshold value is assigned to the setting number of elements 81, while determining a value obtained by adding 1 to the current threshold value as the next threshold value, repeated is a process of assigning the current threshold value (determined threshold value) to a target element 81*a* whose distance to all the determined elements 82 is largest (Steps S232 to S234).

Figure 14:
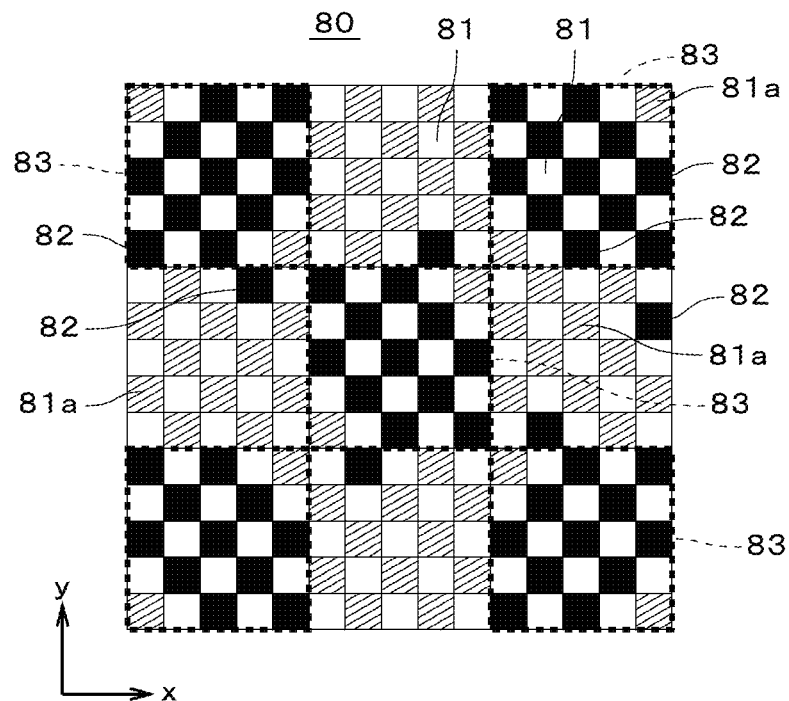
FIG. 14 is a view showing the matrix space.

FIG. 14 is a view showing part of the matrix space 80 in the middle of the intermediate threshold value assignment process. In FIG. 14, for the sake of understanding, the periodic area 83 of which setting is already cancelled is surrounded by a thick broken line. As already described, in the highlight-side threshold value assignment process, the determined element 82 is present only in the periodic area 83. Therefore, in the intermediate threshold value assignment process, it becomes easier to assign the threshold value to the target element 81*a* present in an area other than the periodic areas 83. In other words, the target element 81*a* in an area other than the periodic areas 83 is preferentially determined as the determined element 82.

In the repetition of above-described Step S232, when the current threshold value becomes larger than the second switching threshold value (Yes in Step S234), the intermediate threshold value assignment process is ended. At the end of the intermediate threshold value assignment process, a lot of determined elements 82 are discretely disposed in an area other than the periodic areas 83. Therefore, in the halftone tint image having a tone value larger than the second switching threshold value by 1, faded is the characteristic feature in which the clusters of the dots are disposed periodically (see the clusters of the determined elements 82 in FIG. 12) in the halftone tint image having a tone value larger than the first switching threshold value by 1.

Herein, the second switching threshold value will be described. Since the number of target elements 81*a* in the matrix space 80 is 50% of the number of all the elements, the second switching threshold value set in the intermediate threshold value assignment process is a value not larger than 50% in the entire threshold value range. In an area other than the highlight area of the halftone dot image, in order to reduce the influence of the clusters of the dots disposed in the periodic areas (in other words, to cancel the characteristic feature of the AM screen), it is preferable that a lot of dots should be formed also in an area other than the periodic areas (see FIG. 14). From such a viewpoint, the second switching threshold value is preferably a value not smaller than 35% in the entire threshold value range, and more preferably a value not smaller than 40% in the entire threshold value range.

Figure 15:
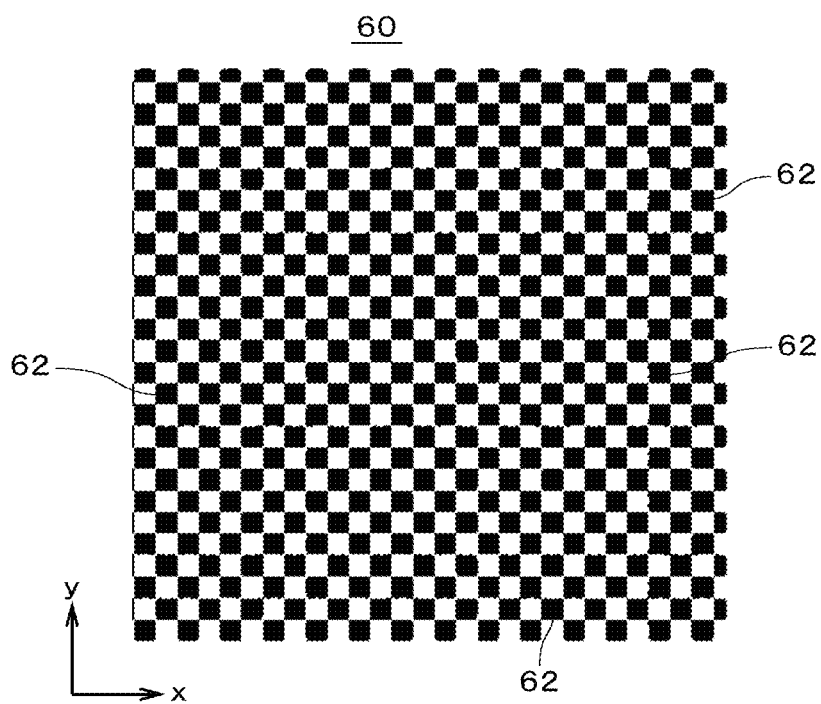
FIG. 15 is a view showing a halftone tint image.

On the other hand, as shown in FIG. 15, in a case where the dots 62 are arranged in a checkerboard-like manner (checkered pattern) in the halftone tint image 60 obtained by using the threshold matrix 8, when there is variation in the dot position or the like, stripe-like density unevenness or the like becomes likely to be conspicuous in the print image. Therefore, in order to suppress the influence of the variation in the dot position or the like on the print image, it is preferable to end the intermediate threshold value assignment process before all the target elements 81*a* become the determined elements 82. From such a viewpoint, the second switching threshold value is preferably a value smaller than 50% in the entire threshold value range, and more preferably a value not larger than 48% in the entire threshold value range. As described later, after the intermediate threshold value assignment process, an element 81 other than the target elements 81*a* is determined as the determined element 82, and fluctuation is further given to the arrangement of the determined elements 82. Further, depending on the use or the like of the printer 1, the second switching threshold value may be a value of 50% in the entire threshold value range.

Figure 16:
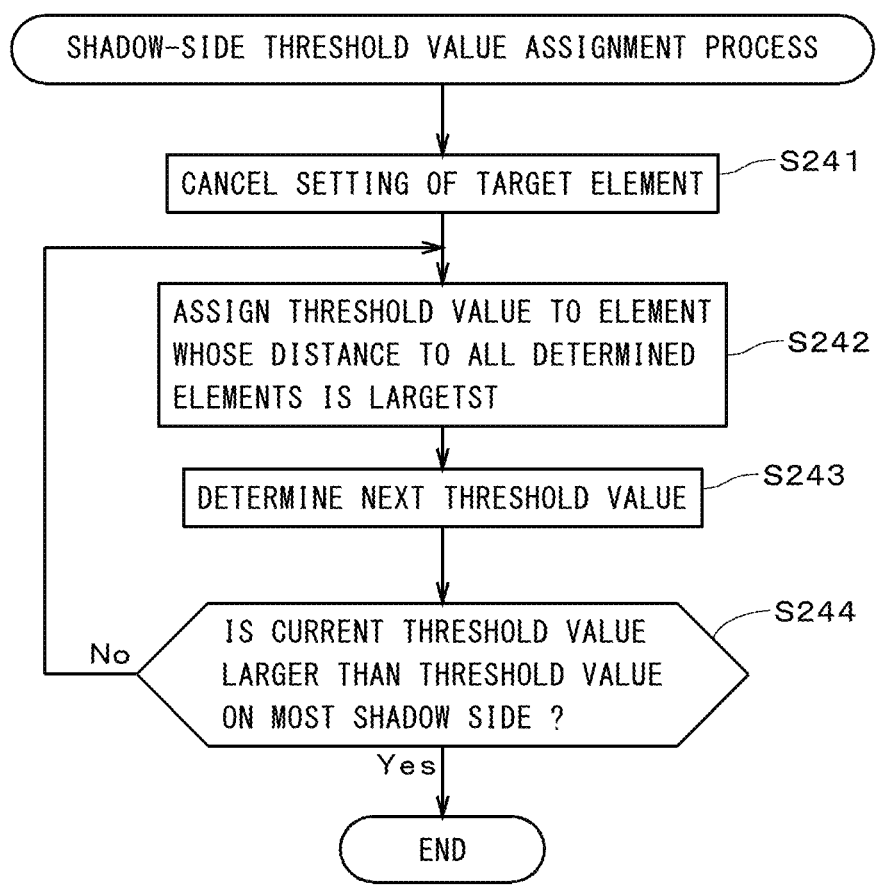
FIG. 16 is a flowchart showing an operation flow of a shadow-side threshold value assignment process.

After the intermediate threshold value assignment process is ended, the shadow processing part 53 of the operation part 50 performs a process of assigning threshold values on the shadow side to the elements 81 in the matrix space 80 (hereinafter, referred to as a "shadow-side threshold value assignment process") (FIG. 6: Step S24). FIG. 16 is a flowchart showing an operation flow of the shadow-side threshold value assignment process. The shadow processing part 53 first cancels setting of the target elements 81*a* in the matrix space 80 (Step S241).

Subsequently, to the remaining elements 81 to which no threshold value is assigned, the threshold values ranging from one next to the second switching threshold value (a value obtained by adding 1 to the second switching threshold value) to one on the most shadow side are sequentially assigned. Specifically, in consideration of repetitive application of the threshold matrix 8 in performing halftoning of the original image 70, an element 81 of which the threshold value is not determined, whose distance to all the determined elements 82 is largest is specified from the whole of the matrix space 80. Then, assuming that the threshold value next to the second switching threshold value is determined as the current threshold value, the current threshold value is assigned to the element 81 (Step S242).

Herein, since the current threshold value is not assigned yet to the setting number of elements 81, the current threshold value is determined as the next threshold value (Step S243). Subsequently, the current threshold value is compared with the already-described threshold value on the most shadow side. The threshold value on the most shadow side is a value of 100% in the entire threshold value range and sufficiently larger than the second switching threshold value. Since the current threshold value is not larger than the threshold value on the most shadow side (Step S244), the process goes back to Step S242 and the current threshold value is assigned to an element 81 whose distance to all the determined elements 82 is largest.

Above-described Step S242 is repeated until the current threshold value is assigned to the setting number of elements 81 (Yes in Step S244). After the current threshold value is assigned to the setting number of elements 81, a value obtained by adding 1 to the current threshold value is determined as the next threshold value (in other words, the next current threshold value (Step S243). Then, until the current threshold value is assigned to the setting number of elements 81, above-described Step S242 is repeated (Steps S243 and S244). Thus, in a case where the current threshold value is assigned to the setting number of elements 81, while determining a value obtained by adding 1 to the current threshold value as the next threshold value, repeated is a process of assigning the current threshold value (determined threshold value) to an element 81 whose distance to all the determined elements 82 is largest (Steps S242 to S244).

Figure 17:
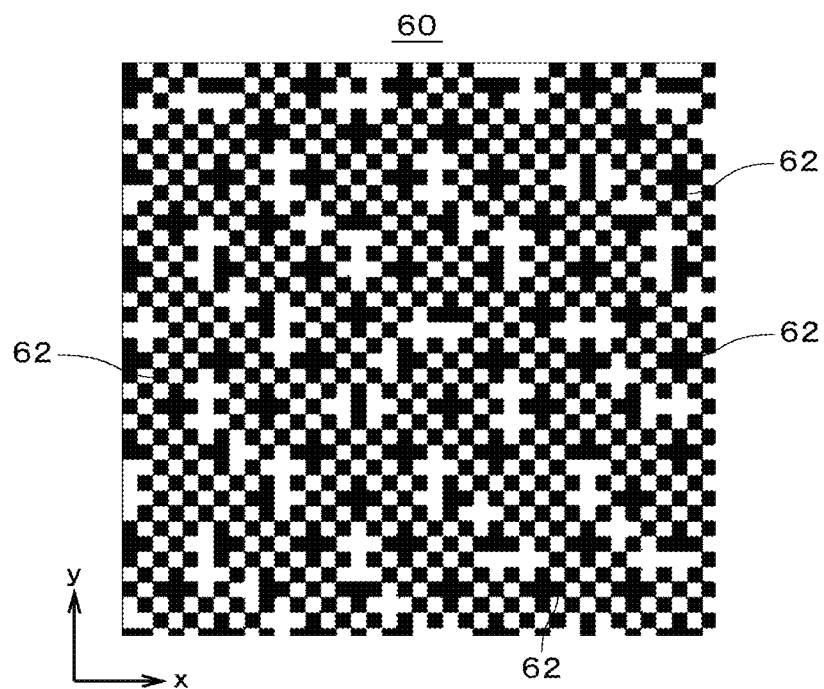
FIG. 17 is a view showing the halftone tint image.
Figure 18:
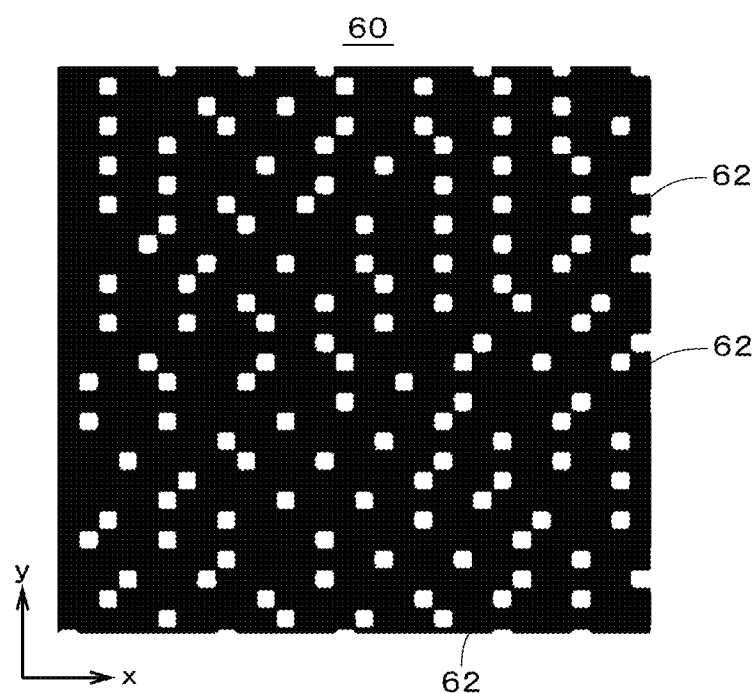
FIG. 18 is a view showing the halftone tint image.

FIGS. 17 and 18 are views each showing part of the halftone tint image 60 obtained by using the threshold matrix 8. FIG. 17 shows the halftone tint image 60 having a tone value of 128, and this arrangement is the same as that of the determined elements 82 in a stage where the current threshold value is 127 in the shadow-side threshold value assignment process. FIG. 18 shows the halftone tint image 60 having a tone value of 217, and this arrangement is the same as that of the determined elements 82 in a stage where the current threshold value is 216 in the shadow-side threshold value assignment process.

In the generation of the threshold matrix 8 used for forming the halftone tint image 60 shown in FIG. 17, the second switching threshold value is 114. Therefore, in the stage where the current threshold value is 127, a lot of elements 81 other than the target elements 81*a* are the determined elements 82, and the randomness of the FM screen is added thereto. As a result, in the halftone tint image 60 of FIG. 17, unlike in the halftone tint image 60 of FIG. 15, the dots 62 are not arranged in a checkerboard-like manner and fluctuation is given to the arrangement of the dots 62. Even in a case where there occurs variation in the dot position or the like, the stripe-like density unevenness or the like thereby becomes hard to be conspicuous in the print image. Actually, in the shadow-side threshold value assignment process, since the same process as that of generating the FM screen is performed for the threshold values ranging from the threshold value next to the second switching threshold value to the threshold value on the most shadow side, it becomes possible to ensure detail reproduction which is a characteristic feature of the FM screen.

In the repetition of above-described Step S242, when the current threshold value becomes larger than the threshold value on the most shadow side (Steps S243 and S244), the shadow-side threshold value assignment process is ended. The threshold matrix 8 in which the threshold values are assigned to all the elements 81 is thereby obtained. The threshold matrix 8 is outputted to the main body control part 4 of FIG. 3 and stored in the matrix storage part 42.

As described above, in Steps S223 to S228 of the highlight-side threshold value assignment process, the threshold values ranging from one on the most highlight side to the first switching threshold value are assigned sequentially to the target elements 81a included in the plurality of periodic areas 83. Therefore, in a case where a plurality of halftone tint images having tone values from the tone value on the most highlight side to a switching tone value larger than the first switching threshold value by 1 are generated by using the threshold matrix 8, in the plurality of halftone tint images, dots are formed only in target pixels existing every other one in the row direction and the column direction in the plurality of periodic areas each of which includes a plurality of pixels, which are disposed periodically and distributed uniformly.

Further, in the above-described process, under a condition that the number of determined elements 82 is almost the same in the plurality of periodic areas 83 and each determined element 82 is positioned in the vicinity of any one determined element 82 in each periodic area 83 (in the above-described exemplary case, positioned adjacent to any one determined element 82), a target element 81a whose distance to all the determined elements 82 is largest is specified within the plurality of periodic areas 83. Therefore, a position to which a dot is added in a transition from a halftone tint image having one tone value to a halftone tint image having a next tone value among the plurality of halftone tint images is a target pixel whose distance to all the already-existing dots is largest, under a condition that the number of dots is almost the same in the plurality of periodic areas and each dot is positioned in the vicinity of any one dot in each periodic area in each halftone tint image.

In Steps S232 to S234 of the intermediate threshold value assignment process, the threshold values ranging from one next to the first switching threshold value to the second switching threshold value are assigned sub sequentially to the target elements 81a among the remaining elements 81 to each of which no threshold value is assigned. Therefore, in a case where the plurality of halftone tint images having tone values from the tone value next to the above-described switching tone value to another switching tone value larger than the second switching threshold value by 1 are generated by using the threshold matrix 8, in the plurality of halftone tint images, dots are formed only in target pixels existing every other one in the row direction and the column direction. Further, in the above-described process, a target element 81a whose distance to all the determined elements 82 is largest is specified. Therefore, a position to which a dot is added in a transition from the halftone tint image having one tone value to the halftone tint image having the next tone value in the above-described plurality of halftone tint images is a target pixel whose distance to all the already-existing dots is largest.

In Steps S242 to S244 of the shadow-side threshold value assignment process, the threshold values ranging from the threshold value next to the second switching threshold value to the threshold value on the most shadow side are assigned sequentially to the remaining elements 81 to each of which no threshold value is assigned. Further, in the process, an element 81 whose distance to all the determined elements 82 is largest is specified. Therefore, in a case where the plurality of halftone tint images having tone values from the tone value next to above-described another switching tone value to the tone value on the most shadow side are generated by using the threshold matrix 8, a position to which a dot is added in a transition from a halftone tint image having one tone value to a halftone tint image having a next tone value is a pixel whose distance to all the already-existing dots is largest.

Figure 6:
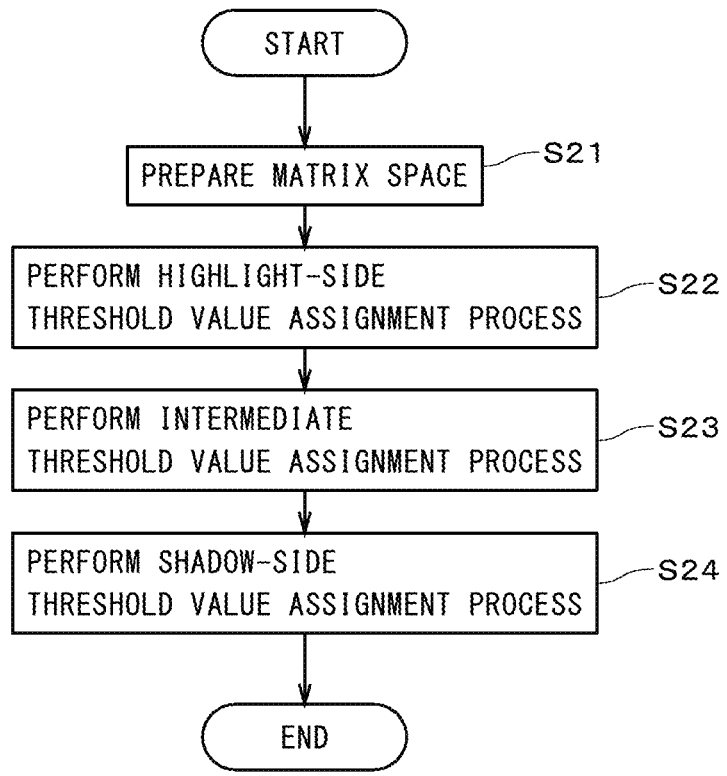
FIG. 6 is a flowchart showing an operation flow for generating the threshold matrix.

As already described, though the threshold matrices 8 for the color components of K, C, M, and Y are generated in the process shown in FIG. 6, it is preferable that the threshold matrices 8 for these color components should be different from one another. Herein, paying attention to two color components among the plurality of color components, one is referred to as a "first color component" and the other is referred to as a "second color component". In a first method for making the threshold matrices 8 for the plurality of color components different from one another, in Step S222 of FIG. 7, the plurality of periodic areas 83 are set in the matrix space 80 so that the arrangement of periodic areas 83 for the first color component and that of the periodic areas 83 for the second color component are different from each other.

Figure 19A:
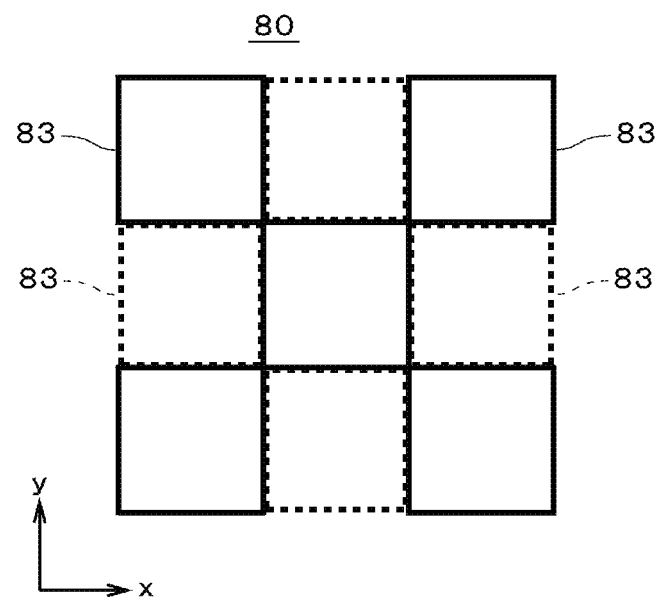
FIGS. 19A and 19B are views each showing the periodic areas.
Figure 19B:
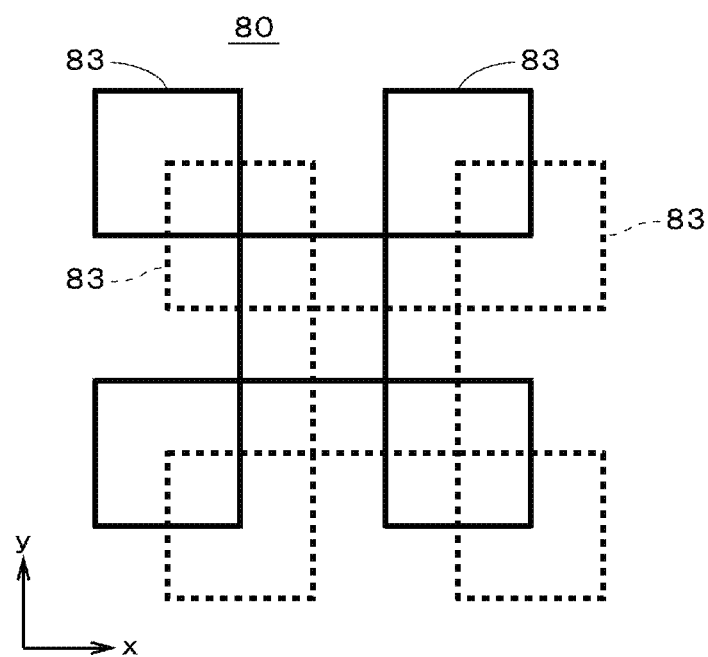

FIGS. 19A and 19B are views each showing the plurality of periodic areas 83 set in the matrix space 80. In FIGS. 19A and 19B, the plurality of periodic areas 83 in the generation of the threshold matrix 8 for the first color component are represented by a solid line and the plurality of periodic areas 83 in the generation of the threshold matrix 8 for the second color component are represented by a broken line. In the exemplary case of FIG. 19A, the periodic areas 83 for both the color components are arranged so that the periodic areas 83 for the first color component and the periodic areas 83 for the second color component do not overlap each other. In the exemplary case of FIG. 19B, the periodic areas 83 for both the color components are arranged so that the periodic areas 83 for the first color component and the periodic areas 83 for the second color component partially overlap each other. Thus, by shifting the arrangement of the periodic areas 83 for each color component, it becomes possible to make the threshold matrices 8 for the plurality of color components different from each other. As a result, as compared with a case where the threshold matrices 8 for the plurality of color components are the same as each other, it becomes possible to suppress occurrence of density unevenness or the like due to the variation in the dot position or the like.

In a second method for making the threshold matrices 8 for the plurality of color components different from one another, in the generation of the threshold matrix 8 for the second color component, a position of the target element 81a to which the threshold value is assigned in first Step S225 of FIG. 7 is determined so as to be different from a position in the generation of the threshold matrix 8 for the first color component. As a result, in the repetition of Steps S223, S224, and S228 (S225), the respective arrangements of the target elements 81a to which the threshold values are sequentially assigned are different between in the matrix space 80 for the first color component and in the matrix space 80 for the second color component.

Figure 20:
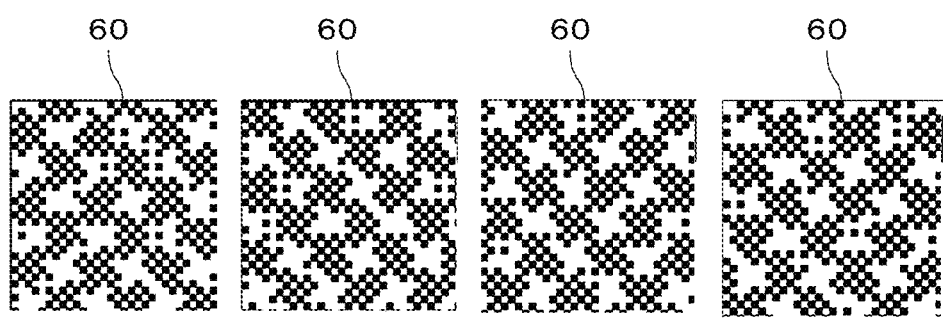
FIG. 20 is a view showing respective halftone tint images for a plurality of color components.
Figure 21:
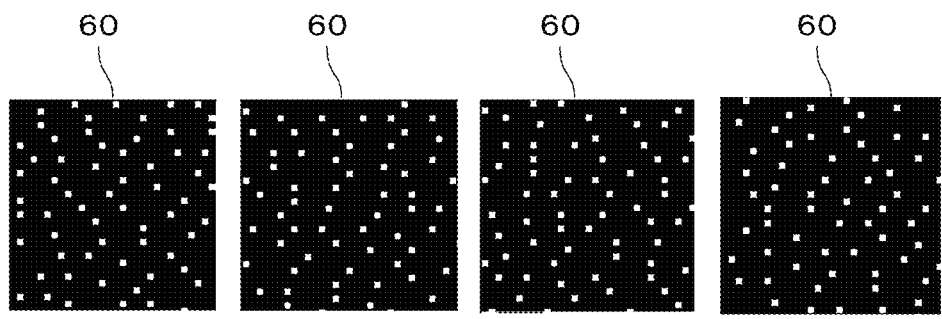
FIG. 21 is a view showing respective halftone tint images for a plurality of color components.

FIGS. 20 and 21 are views each partially showing respective halftone tint images 60 obtained by using the threshold matrices 8 for the plurality of color components, and each showing the respective halftone tint images 60 for K, C, M, and Y in this order from the left side to the right side. FIG. 20 shows the halftone tint images 60 having a tone value larger than the first switching threshold value and smaller than the second switching threshold value, and the dot arrangement in each image is the same as the arrangement of the determined elements 82 in a certain stage in the intermediate threshold value assignment process. FIG. 21 shows the halftone tint images 60 having a tone value larger than the second switching threshold value, and the dot arrangement in each image is the same as the arrangement of the determined elements 82 in a certain stage in the shadow-side threshold value assignment process. The matrices 8 for the plurality of color components used for generating the halftone tint images 60 shown in FIGS. 20 and 21 are different from each other by adopting the above-described first or second method.

In the respective halftone dot images (halftone tint images 60) for K, C, M, and Y shown in FIGS. 20 and 21, the arrangements of dots are different among them in any one of a tone range on the highlight side where the dots are formed in the periodic area, an intermediate tone range where the dots are formed preferentially in an area other than the periodic areas, and a tone range on the shadow side where the same process as that for the FM screen is performed. In the halftone dot images for K, C, M, and Y, since the randomness in the arrangement of the dots is high, it becomes possible to suppress occurrence of density unevenness or the like due to disturbance or the variation in the dot position or the like. Further, by changing a weighting factor or the like included in a mathematical expression (formula) used for specifying an element 81 whose distance to all the determined elements 82 is largest or changing the mathematical expression itself, the threshold matrices 8 for the plurality of color components may be made different from one another.

Figure 22:
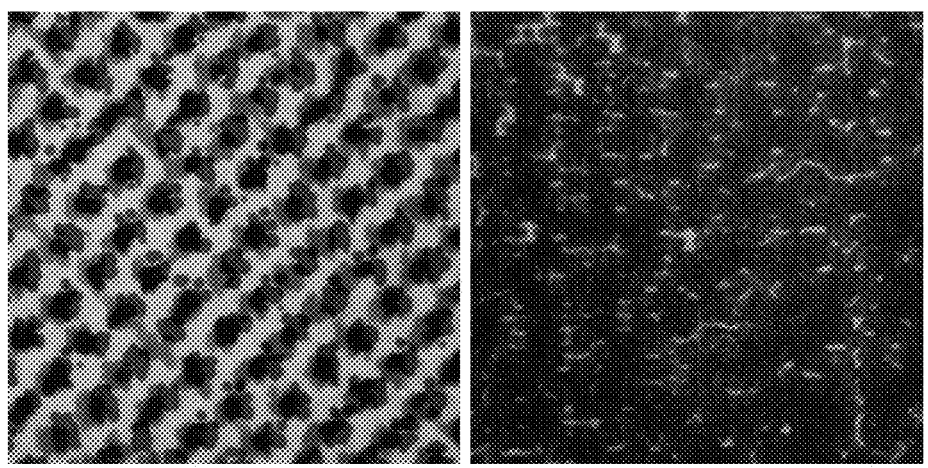
FIG. 22 shows respective photographs representing a highlight area and a shadow area of a print image.
Figure 23:
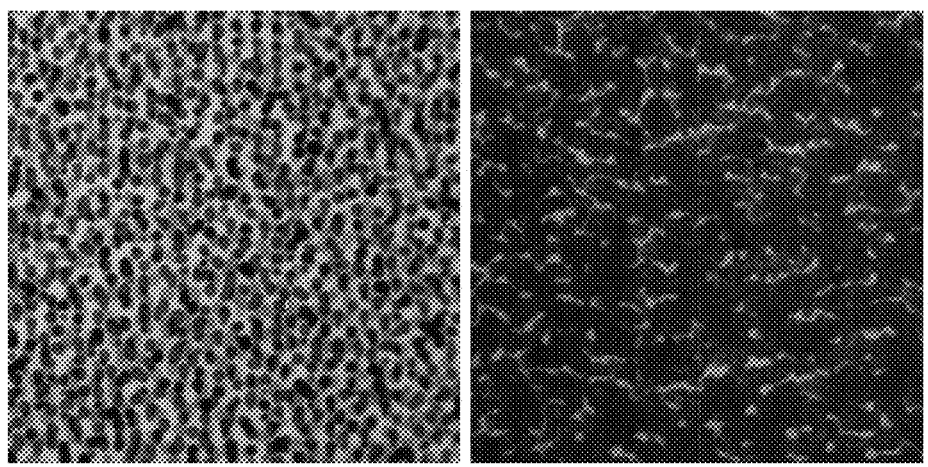
FIG. 23 shows respective photographs representing a highlight area and a shadow area of a print image of a comparative example.

Next, the print image printed on the printing paper 9 by using the threshold matrix 8 is compared with a print image printed on the printing paper 9 by using a general threshold matrix for FM screen. FIG. 22 shows respective photographs representing the highlight area and the shadow area of the print image printed by using the threshold matrix 8. FIG. 23 shows respective photographs representing a highlight area and a shadow area of a print image of a comparative example which is printed by using the general threshold matrix for FM screen. In FIGS. 22 and 23, the left-side photo shows the highlight area and the right-side photo shows the shadow area. As already described, the highlight area is an area corresponding to the area consisting of pixels having tone values on the highlight side in the original image 70. Further, the shadow area is an area corresponding to the area consisting of pixels having tone values on the shadow side in the original image 70.

In the highlight area on the left side of FIG. 23, since a lot of dots are irregularly arranged, visual roughness is easy to occur and the graininess is deteriorated. On the other hand, in the highlight area on the left side of FIG. 22, since clusters of the dots are disposed periodically, visual roughness is hard to occur and the graininess is improved. The shadow area on the right side of FIG. 22 and the shadow area on the right side of FIG. 23 are almost the same as each other.

Figure 24:
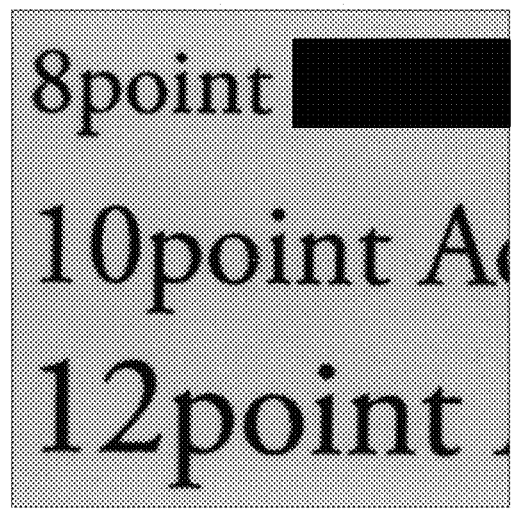
FIG. 24 is a photograph representing a print image.
Figure 25:
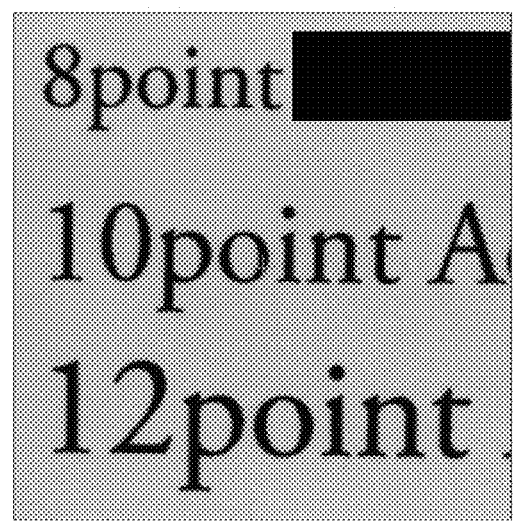
FIG. 25 is a photograph representing a print image of the comparative example.

FIG. 24 is a photograph representing part of the print image printed by using the threshold matrix 8. FIG. 25 is a photograph representing part of a print image of the comparative example which is printed by using the general threshold matrix for FM screen. FIGS. 24 and 25 each show an area for characters. Both in FIGS. 24 and 25, no line breakage or the like occurs and the same detail reproduction is achieved.

As described above, a method of generating the threshold matrix 8 includes a step of preparing the matrix space 80 (Step S21), a step of setting the plurality of periodic areas 83 in the matrix space 80 (Step S222), a step of setting the elements 81 existing every other one in the row direction and the column direction in each periodic area 83, as target elements 81a (Step S221), a step of assigning the threshold values ranging from one on the most highlight side to the predetermined switching threshold value (the first switching threshold value) sequentially to the target elements 81a included in the plurality of periodic areas 83 (Steps S223 to S228), and a step of assigning the remaining threshold values sequentially to the remaining elements 81 to each of which no threshold value is assigned after Steps S223 to S228 (Steps S23 and S24). Further, assuming that the elements 81 to which the threshold values are assigned are regarded as the determined elements 82, when each threshold value is assigned in Steps S223 to S228, under a condition that the number of determined elements 82 is almost the same in the plurality of periodic areas 83 and each determined element 82 is positioned in the vicinity of any one determined element 82 in each periodic area 83, a target element 81a whose distance to all the determined elements 82 is largest is specified within the plurality of periodic areas 83 and the threshold value is assigned to the target element 81a.

By this method, in the highlight area of the print image, like in the AM screen, since the clusters of dots are disposed periodically, roughness is hard to occur and the graininess can be improved. Further, in the highlight area of the print image, since it can be avoided that the dots (of the same color) are adjacent to one another in up/down and left/right directions, it is possible to suppress occurrence of beading. Further, it is possible to reduce areas in which the dots overlap each other in the highlight area and efficiently change the density in the tone change on the highlight side. In the plurality of periodic areas in the print image, since the outer shapes of the clusters of the dots become easy to be different from each other, it is possible to suppress occurrence of the density unevenness or the like due to the variation in the dot position or the like.

Preferably, in Steps S223 to S228, a target element 81a adjacent to any one determined element 82 is specified and the threshold value is assigned to the target element 81a. It is thereby possible to suppress a distance between the dots forming a cluster of dots from becoming excessively large so that the dots can be recognized as one dot cluster and possible to reliably improve the graininess in the highlight area of the print image.

Preferably, in assigning each threshold value in Steps S23 and S24, an element 81 whose distance to all the determined elements 82 is largest is specified and the threshold value is assigned to the element 81. It is thereby possible to improve the graininess in the highlight area of the print image like in the AM screen, and possible to improve detail reproduction which is reduced in the AM screen.

Preferably, in Step S221, the elements 81 existing every other one in the row direction and the column direction in the matrix space 80 are set as target elements 81a. Further, above-described Steps S23 and S24 include a step of assigning the threshold values ranging from one next to the above-described switching threshold value to another switching threshold value (the second switching threshold value) sequentially to the target elements 81a among the remaining elements 81 (Steps S232 to S234) and a step of assigning the threshold values ranging from one next to another switching threshold value to one on the most shadow side sequentially to the remaining elements 81 to each of which no threshold value is assigned after Steps S232 to S234 (Steps S242 to S244). It is thereby possible to prevent the dots from being adjacent to one another in up/down and left/right directions in a wide tone range and possible to suppress occurrence of beading and ensure an increase in the efficiency of dot gain.

Preferably, by repeating the above-described method of generating the threshold matrix 8, the threshold matrix 8 for the first color component and the threshold matrix 8 for the second color component are generated. Further, also in Steps S223 to S228 in the generation of the threshold matrix 8 for the first color component, the position of the target element 81a to which the threshold value on the most highlight side is first assigned is different from that in the generation of the threshold matrix 8 for the second color component. It is thereby possible to make the threshold matrix 8 for the first color component and the threshold matrix 8 for the second color component different from each other and possible to suppress occurrence of the density unevenness or the like in the print image due to the variation in the dot position or the like.

Further, the arrangement of the plurality of periodic areas 83 in the generation of the threshold matrix 8 for the first color component may be different from that in the generation of the threshold matrix 8 for the second color component. Also in this case, it is possible to make the threshold matrix 8 for the first color component and the threshold matrix 8 for the second color component different from each other and possible to suppress occurrence of the density unevenness or the like due to the variation in the dot position or the like.

The image data generation method includes a step of preparing the threshold matrix 8 generated by the above-described generation method (Step S11) and a step of generating halftone dot image data in which the multi-tone original image 70 is halftoned by comparing the original image 70 with the threshold matrix 8 (Step S12). It is thereby possible to generate the halftone dot image in which the graininess is improved in the highlight area.

In the threshold matrix 8, in a case where the plurality of halftone tint images having respective tone values ranging from one on the most highlight side to the predetermined switching tone value are generated, in the plurality of halftone tint images, the dots are formed only in the target pixels existing every other one in the row direction and the column direction in the plurality of periodic areas disposed periodically and distributed uniformly, each of which includes a plurality of pixels. Further, a position to which a dot is added in a transition from the halftone tint image having one tone value to the halftone tint image having the next tone value among the plurality of halftone tint images is a target pixel whose distance to all the already-existing dots is largest, under a condition that the number of dots is almost the same in the plurality of periodic areas and each dot is positioned in the vicinity of any one dot in each periodic area in each halftone tint image. It is thereby possible to improve the graininess in the highlight area of the print image and efficiently change the density in the tone change on the highlight side.

In the image data generation apparatus (the main body control part 4 in the above-described exemplary case) includes the matrix storage part 42 storing the above-described threshold matrix 8 and the image data generator (the comparator 43 in the above-described exemplary case) for generating the halftone dot image data in which the multi-tone original image 70 is halftoned by comparing the original image 70 with the threshold matrix 8. It is thereby possible to generate a halftone dot image in which the graininess is improved in the highlight area.

Figure 26A:
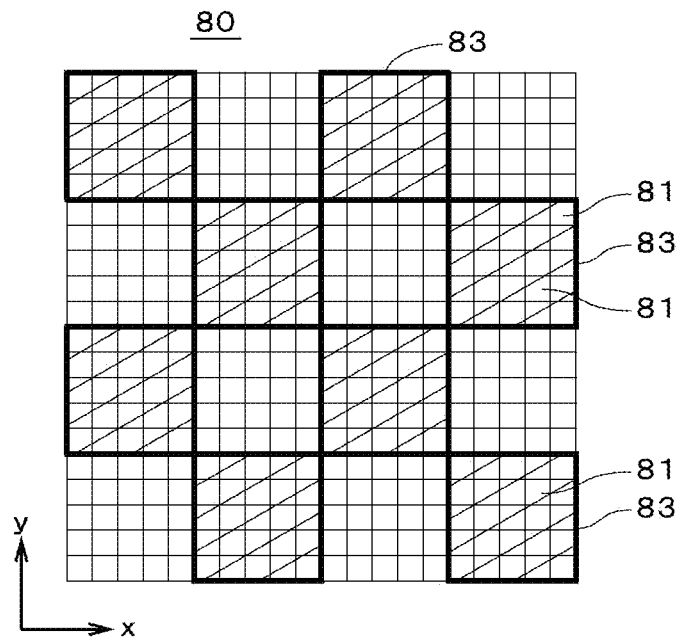
FIGS. 26A to 26F are views each showing other exemplary periodic areas.
Figure 26B:
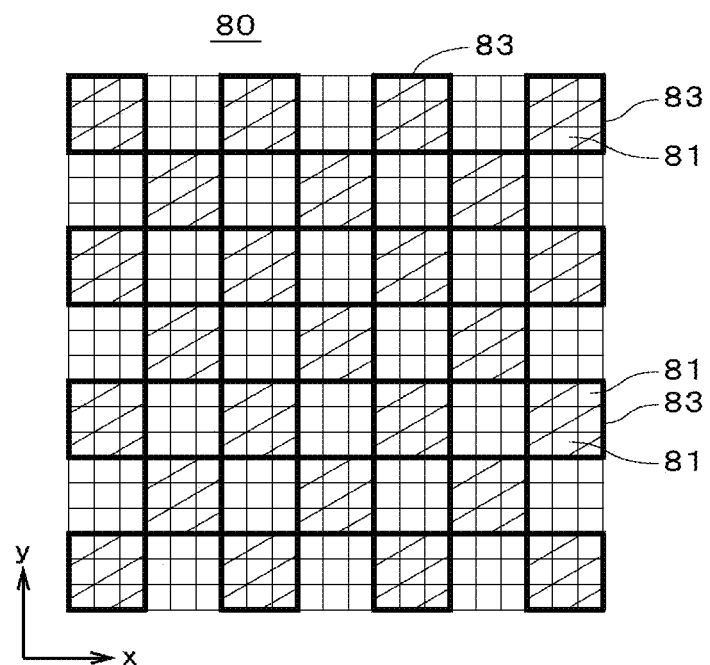

FIGS. 26A to 26F are views each showing another exemplary periodic areas 83. In FIGS. 26A to 26F, the periodic areas 83 are hatched. Though the periodic area 83 is a square area consisting of elements 81 in five rows and five columns in the above-described exemplary case (see FIG. 26A), as shown in FIG. 26B, the periodic area 83 may be a smaller area. In a case where ink which is easy to bleed or a base material on which ink is easy to bleed is used, or the like case, for example, in order to suppress the dots in adjacent periodic areas in the print image from being coupled, it is preferable to adopt a large periodic area 83.

Figure 26C:
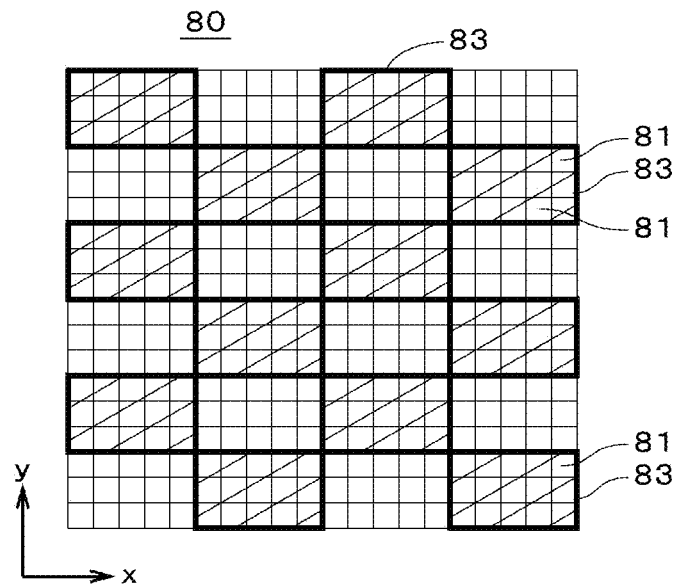
Figure 26D:
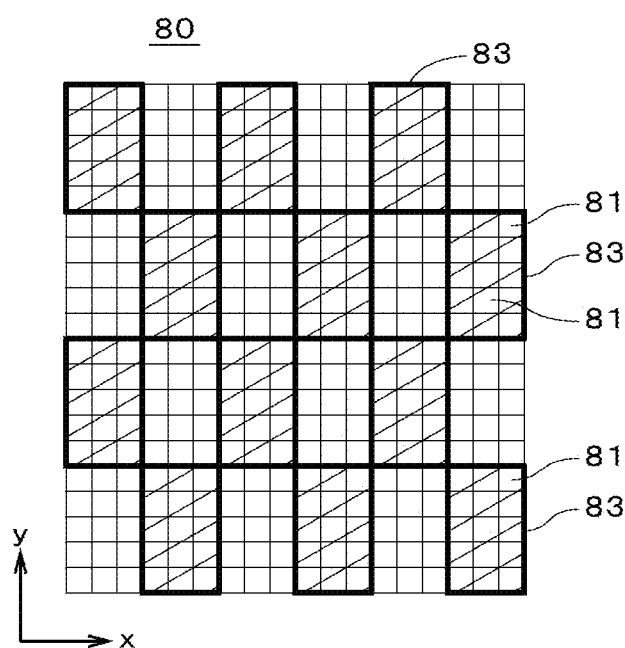

Further, in a case where respective resolutions (dpi) in the width direction and the moving direction are different from each other in the printer 1, or the like case, as shown in FIGS. 26C and 26D, the number of elements 81 in the row direction and that in the column direction in each periodic area 83 may be different from each other. In the exemplary case of FIG. 26C, since the resolution in the moving direction corresponding to the column direction is almost half of that in the width direction corresponding to the row direction, the number of elements 81 in the column direction in each periodic area 83 is almost half of that in the row direction. In the exemplary case of FIG. 26D, since the resolution in the width direction is almost half of that in the moving direction, the number of elements 81 in the row direction in each periodic area 83 is almost half of that in the column direction. Thus, by adjusting an aspect ratio of the periodic area 83 to the resolutions in the width direction and the moving direction, it is possible to suppress the outer shape of the cluster of dots in the highlight area of the print image from being a flat shape. Furthermore, though the number of elements 81 in each direction in the periodic area 83 is not particularly limited, the number is, for example, not smaller than three and not larger than eight.

Figure 26E:
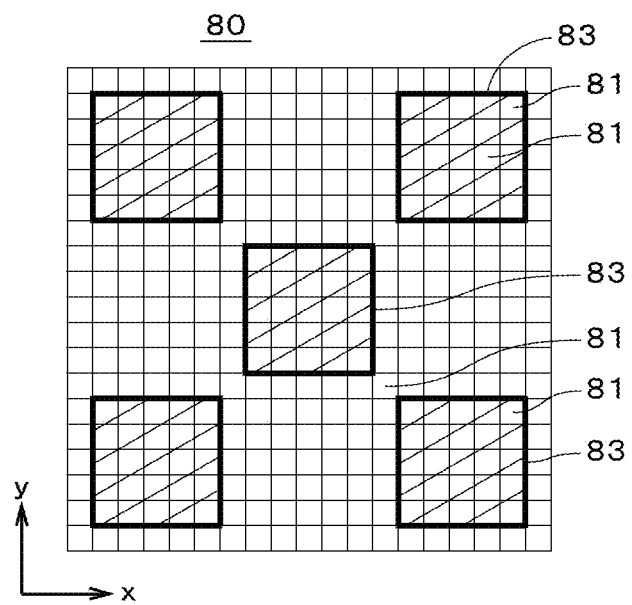
Figure 26F:
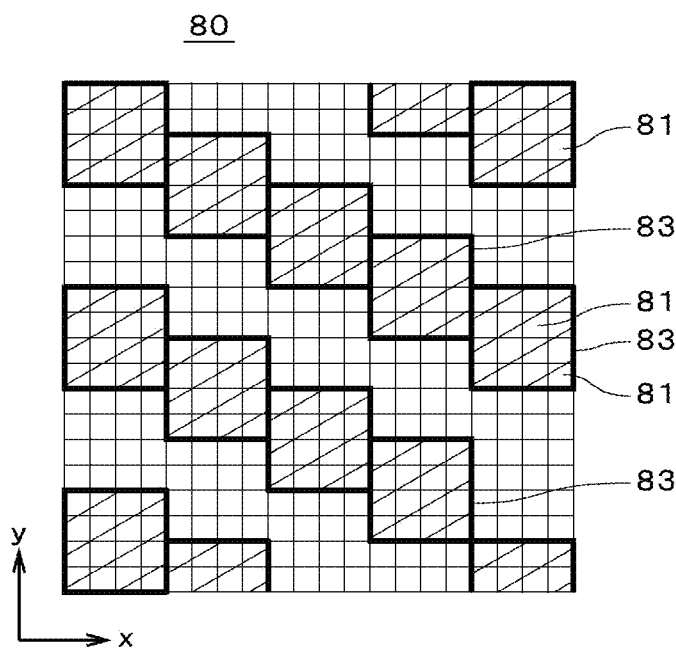

If the periodic areas 83 are disposed periodically and distributed uniformly, as shown in FIG. 26E, a gap (elements 81) may be provided between the adjacent periodic areas 83 in the diagonal direction. Further, as shown in FIG. 26F, assuming that a plurality of periodic areas 83 arranged in a direction inclined to the row direction are determined as a group of periodic areas, a plurality of groups of periodic areas may be arranged in the column direction. Thus, the plurality of periodic areas 83 are arranged at regular intervals in each of two intersecting directions. The shape of the periodic area 83 is not limited to a rectangle but may be any given shape such as a rhombus or the like.

Figure 27:
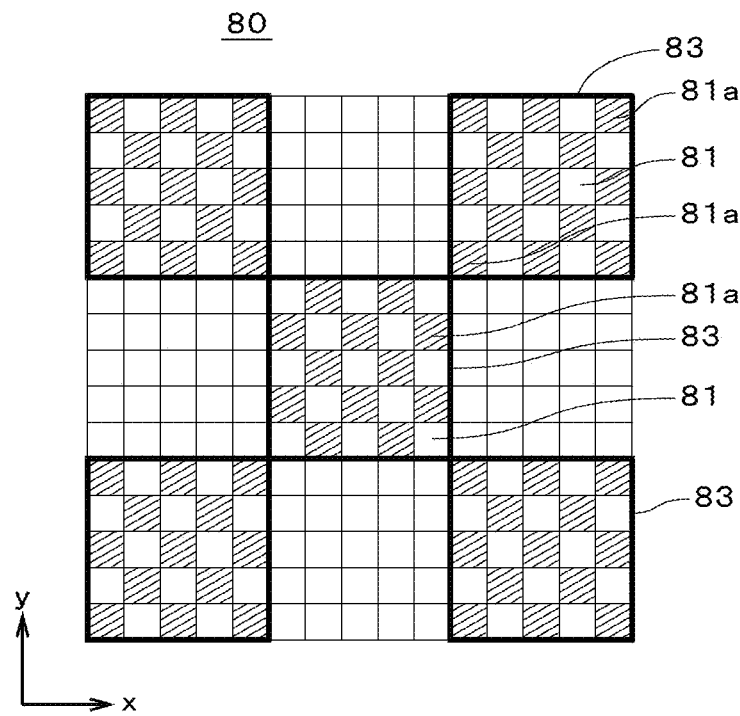
FIG. 27 is a view showing the matrix space.

FIG. 27 is a view showing the matrix space 80 in another exemplary process. In the present exemplary process, the target elements 81a are set only in the periodic areas 83 (FIG. 7: Steps S221 and S222). At that time, in the two periodic areas 83 adjacent to each other in the diagonal direction, the arrangement of the target elements 81a is shifted so that the target elements 81a are not continuous to each other. In other words, in the two periodic areas 83, at least one of the two elements 81 adjacent to each other in the diagonal direction is a non-target element. In the highlight area of the print image, it is thereby possible to more reliably suppress the clusters of dots from being connected to each other. The process of Steps S223 to S228 for assigning the threshold values to the target elements 81a included in the plurality of periodic areas 83 is the same as the above-described exemplary process.

As described above, in the generation of the threshold matrix 8, in at least each periodic area 83, elements 81 existing every other one in the row direction and the column direction have only to be set as target elements 81a. It is thereby possible to efficiently change the density in the tone change on the highlight side.

In the present exemplary process in which no target element 81a is set in an area other than the periodic areas 83, after the end of the highlight-side threshold value assignment process, the remaining threshold values are assigned sequentially to the remaining elements 81 to each of which no threshold value is assigned. Specifically, like in the above-described shadow-side threshold value assignment process, when each threshold value is assigned, an element 81 whose distance to all the determined elements 82 is largest is specified and the threshold value is assigned to the specified element 81 while considering repetitive application of the threshold matrix 8 in performing halftoning of the original image 70.

In the generation of the threshold matrix 8 and the generation of image data using the threshold matrix 8 described above, various modifications can be made.

Figure 28:
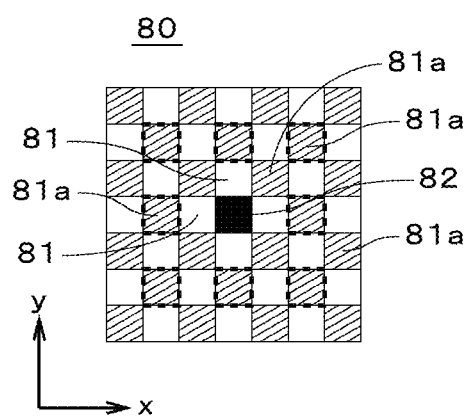
FIG. 28 is a view showing the matrix space.

Though the condition that each determined element 82 is adjacent to any one determined element 82 in each periodic area 83 is set when each threshold value is assigned in Steps S223 to S228 in the above-described preferred embodiment, each determined element 82 has only to be positioned in the vicinity of any one determined element 82. In the exemplary case of FIG. 28, the target element 81a (the target element 81a surrounded by a broken line in FIG. 28) adjacent to the elements 81 in the 8 neighborhood around the central determined element 82 is also included in the candidates for the target element 81a to which the current threshold value is to be assigned in Step S228. In other words, the target element 81a adjacent to the elements 81 in the 8 neighborhood around the determined element 82 also becomes a determined element 82 positioned in the vicinity of the above determined element 82 when the threshold value is assigned. The dots in the print image corresponding to these determined elements 82 form one cluster of dots.

Which of setting of the target elements 81a in Step S221 of FIG. 7 and setting of the plurality of periodic areas 83 in Step S222 of FIG. 7 may be performed first. Further, it is not always necessary to explicitly perform the respective settings of the target elements 81a and the periodic areas 83, and the target element 81a and the periodic areas 83 may be only considered in an arithmetic operation for specifying the element 81 to which the threshold value is to be assigned. Also in this case, it can be thought that the setting of the target elements 81a and the setting of the plurality of periodic areas 83 are substantially performed.

After performing the highlight-side threshold value assignment process, in the process in which the remaining threshold values are assigned to the remaining elements 81 to each of which no threshold value is assigned, it is not always necessary to specify an element 81 whose distance to all the determined elements 82 is largest, but the element 81 to which the threshold value is to be assigned may be specified by any other method.

In the generation of the threshold matrices 8 for the plurality of color components, a shape or a size of the plurality of periodic areas 83 in the generation of the threshold matrix 8 for the first color component may be different from that in the generation of the threshold matrix 8 for the second color component. Also in this case, it is possible to make the threshold matrix 8 for the first color component and the threshold matrix 8 for the second color component different from each other, and possible to suppress occurrence of density unevenness or the like in the print image.

In the threshold matrices for the plurality of color components (for example, K, C, M, and Y), the threshold matrices for some color components may be any one of other kinds of threshold matrices, such as the threshold matrix for FM screen or the like.

The above-described threshold matrix 8 may be used in any other apparatus concerning formation of the print image, such as an electrophotographic printer, a plate making apparatus for CTP (Computer To Plate) used for offset printing or the like, or the like. Also in any other apparatus, by using the threshold matrix 8, it is possible to ease overlap of the dots in the highlight area of the print image to thereby improve the graininess and possible to efficiently change the density in the tone change on the highlight side.

The configurations in the above-described preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

4 Main body control part
5 Computer
8 Threshold matrix
42 Matrix storage part
43 Comparator
60 Halftone tint image
62 Dot
70 Original image
80 Matrix space
81 Element
81a Target element
82 Determined element
83 Periodic area
900 Program
S11 to S15, S21 to S24, S221 to S228, S231 to S234, S241 to S244 Step

The invention claimed is:
1. A threshold matrix generation method for generating a threshold matrix to be compared with a multi-tone original image in performing halftoning of said original image, the threshold matrix generation method comprising:
   a) preparing a matrix space which is a set of elements arranged in a row direction and a column direction, said matrix space being a storage area in a computer;
   b) setting a plurality of periodic areas disposed periodically and distributed uniformly in said matrix space, each of said plurality of periodic areas including a plurality of elements;
   c) setting elements existing every other one in said row direction and said column direction in at least each periodic area, as target elements;
   d) assigning threshold values ranging from one on a most highlight side to a predetermined switching threshold value sequentially to the target elements included in said plurality of periodic areas; and e) assigning remaining threshold values sequentially to remaining elements to each of which no threshold value is assigned after said operation d), wherein assuming that elements to which threshold values are assigned are regarded as determined elements, when each threshold value is assigned in said operation d), under a condition that the number of determined elements is almost same in said plurality of periodic areas and each determined element is positioned adjacent to any one determined element in each periodic area, in consideration of repetitive application of said threshold matrix in performing halftoning of said original image, a target element whose distance to all determined elements is largest is specified within said plurality of periodic areas and said each threshold value is assigned to said target element, thereby to grow a cluster of determined elements in said each periodic area.

2. The threshold matrix generation method according to claim 1, wherein when each threshold value is assigned in said operation e), in consideration of repetitive application of said threshold matrix in performing halftoning of said original image, an element whose distance to all determined elements is largest is specified and said each threshold value is assigned to said element.

3. The threshold matrix generation method according to claim 2, wherein elements existing every other one in said row direction and said column direction in said matrix space are set as target elements in said operation c), and said operation e) comprises:

e1) assigning threshold values ranging from one next to said switching threshold value to another switching threshold value sequentially to target elements among said remaining elements; and e2) assigning threshold values ranging from one next to said another switching threshold value to one on a most shadow side sequentially to remaining elements to each of which no threshold value is assigned after said operation e1).

4. The threshold matrix generation method according to claim 1, wherein by repeating said operation a) to said operation e), a threshold matrix for a first color component and a threshold matrix for a second color component are generated, and in generation of said threshold matrix for said first color component, in said operation d), a position of a target element to which a threshold value on said most highlight side is first assigned is different from that in generation of said threshold matrix for said second color component.

5. The threshold matrix generation method according to claim 1, wherein by repeating said operation a) to said operation e), a threshold matrix for a first color component and a threshold matrix for a second color component are generated, and an arrangement, a shape, or a size of said plurality of periodic areas in generation of said threshold matrix for said first color component is different from that in generation of said threshold matrix for said second color component.

6. An image data generation method for generating image data, comprising:

preparing a threshold matrix generated by the threshold matrix generation method according to claim 1; and generating halftone dot image data in which said multi-tone original image is halftoned by comparing said original image with said threshold matrix.

7. A non-transitory storage medium storing a program to cause a computer to generate a threshold matrix to be compared with a multi-tone original image in performing halftoning of said original image, said program being executed by a computer to cause said computer to perform:

a) preparing a matrix space which is a set of elements arranged in a row direction and a column direction, said matrix space being a storage area in said computer;

b) setting a plurality of periodic areas disposed periodically and distributed uniformly in said matrix space, each of said plurality of periodic areas including a plurality of elements;

c) setting elements existing every other one in said row direction and said column direction in at least each periodic area, as target elements;

d) assigning threshold values ranging from one on a most highlight side to a predetermined switching threshold value sequentially to target elements included in said plurality of periodic areas; and e) assigning remaining threshold values sequentially to remaining elements to each of which no threshold value is assigned after said operation d), wherein assuming that elements to which threshold values are assigned are regarded as determined elements, when each threshold value is assigned in said operation d), under a condition that the number of determined elements is almost same in said plurality of periodic areas and each determined element is positioned adjacent to any one determined element in each periodic area, in consideration of repetitive application of said threshold matrix in performing halftoning of said original image, a target element whose distance to all determined elements is largest is specified within said plurality of periodic areas and said each threshold value is assigned to said target element, thereby to grow a cluster of determined elements in said each periodic area.

8. An image data generation apparatus for generating image data, comprising:

a matrix storage part storing a threshold matrix; and an image data generator for generating halftone dot image data in which a multi-tone original image is halftoned by comparing said original image with said threshold matrix, wherein when a plurality of halftone tint images having respective tone values ranging from one on a most highlight side to a predetermined switching tone value are generated, in said plurality of halftone tint images, dots are formed only in target pixels existing every other one in a row direction and a column direction in a plurality of periodic areas disposed periodically and distributed uniformly, each of said plurality of periodic areas including a plurality of pixels, and a position to which a dot is added in a transition from a halftone tint image having one tone value to a halftone tint image having a next tone value among said plurality of halftone tint images is a target pixel whose distance to all already-existing dots is largest, under a condition that the number of dots is almost same in said plurality of periodic areas and each dot is positioned adjacent to any one dot in each periodic area in each halftone tint image, thereby to grow a cluster of dots in said each periodic area.

\* \* \* \* \*